(12) United States Patent
Tranquilla

(10) Patent No.: US 9,908,095 B2
(45) Date of Patent: Mar. 6, 2018

(54) ELECTROMAGNETIC ENERGY-INITIATED PLASMA REACTOR SYSTEMS AND METHODS

(71) Applicant: Atlantic Hydrogen Inc., Fredericton (CA)

(72) Inventor: James Tranquilla, New Brunswick (CA)

(73) Assignee: Atlantic Hydrogen Inc., New Brunswick (CA)

( * ) Notice: Subject to any disclaimer, the term of this patent is extended or adjusted under 35 U.S.C. 154(b) by 286 days.

(21) Appl. No.: 14/415,294

(22) PCT Filed: Jul. 18, 2013

(86) PCT No.: PCT/CA2013/000652
§ 371 (c)(1),
(2) Date: Jan. 16, 2015

(87) PCT Pub. No.: WO2014/012169
PCT Pub. Date: Jan. 23, 2014

(65) Prior Publication Data
US 2015/0174550 A1 Jun. 25, 2015

Related U.S. Application Data

(60) Provisional application No. 61/672,846, filed on Jul. 18, 2012, provisional application No. 61/672,842, filed on Jul. 18, 2012.

(51) Int. Cl.
*B01J 19/12* (2006.01)
*B01J 19/10* (2006.01)
*B01J 19/08* (2006.01)

(52) U.S. Cl.
CPC ...... *B01J 19/088* (2013.01); *B01J 2219/0869* (2013.01); *B01J 2219/0883* (2013.01)

(58) Field of Classification Search
None
See application file for complete search history.

(56) References Cited

U.S. PATENT DOCUMENTS 5,750,823 A * 5/1998 Wofford ................. B01D 53/32
423/210
6,153,852 A 11/2000 Blutke et al.
(Continued)

FOREIGN PATENT DOCUMENTS

EP 1188801 A1 3/2002
EP 0845287 B1 12/2003

OTHER PUBLICATIONS

Extended European Search Report issued in European Application No. 13820265.0; dated Mar. 9, 2016 (6 pages).
(Continued)

*Primary Examiner* — Kishor Mayekar
(74) *Attorney, Agent, or Firm* — Osha Liang LLP

(57) ABSTRACT

A method of processing a reaction product generated from a plasma-based reactive process includes: supplying a first electromagnetic energy to a flowing primary gaseous feed material, such that at least a fraction of the flowing primary gaseous feed material is excited by the supplied first electromagnetic energy into a first plasma within a first plasma zone, and such that at least a fraction of the flowing primary gaseous feed material is converted to a first plasma zone-conditioned product while flowing through the first plasma and the first plasma zone-conditioned product is flowed to a downstream reaction zone. A second gaseous material is then introduced to the downstream reaction zone. The first plasma zone-conditioned product is contacted with the second gaseous material within the downstream reaction zone.

21 Claims, 8 Drawing Sheets

(56) References Cited

U.S. PATENT DOCUMENTS

| | | |
|---|---|---|
| 6,238,629 B1 | 5/2001 | Barankova et al. |
| 6,290,918 B1 * | 9/2001 | Rostaing .............. B01D 53/323 |
| | | 422/186 |
| RE43,332 E | 5/2012 | Tribelsky et al. |
| 2010/0200390 A1 | 8/2010 | Ikeda et al. |

OTHER PUBLICATIONS

International Search Report issued in PCT/CA2013/000652 dated Oct. 9, 2013 (4 pages).
Written Opinion of the International Searching Authority issued in PCT/CA2013/000652 dated Oct. 9, 2013 (7 pages).

* cited by examiner

ELECTROMAGNETIC ENERGY-INITIATED PLASMA REACTOR SYSTEMS AND METHODS

CROSS REFERENCE TO RELATED APPLICATIONS

This is a national stage application based on PCT/CA2013/000652, filed on Jul. 18, 2013, which claims priority to U.S. Patent Application No. 61/672,842, filed on Jul. 18, 2012, and U.S. Patent Application No. 61/672,846, filed on Jul. 18, 2012. This application claims the benefits and priority of these prior applications and incorporates their disclosures by reference in their entireties.

FIELD

The disclosure relates to electromagnetic energy-initiated plasma reactor systems and methods and, more specifically, apparatus and/or method(s) for operating one or more plasma processes.

BACKGROUND

Coupling of existing electromagnetic energy-initiated plasma processes with other downstream processes, such as other thermal or plasma-based reactive processes, including those involving secondary electromagnetic energy-initiated plasma processes, can create process control challenges, as it is difficult to regulate such serial processes and control thermal energy losses and energy radiation with the processes. It would be desirable to provide a plasma reactor system which addresses one or more of these issues.

SUMMARY

In one aspect, there is provided a method of processing a reaction product generated from a plasma-based reactive process within a material processing zone of a reactor. The method includes supplying a first electromagnetic energy, from a first energy source, to a flowing primary gaseous feed material, such that at least a fraction of the flowing primary gaseous feed material is excited by the supplied first electromagnetic energy into a first plasma within a first plasma zone, and such that at least a fraction of the flowing primary gaseous feed material is converted to a first plasma zone-conditioned product while flowing through the first plasma and the first plasma zone-conditioned product is flowed to a downstream reaction zone, wherein the flowing of the first plasma zone-conditioned product is effected through a fluid passage that effects fluid communication between the first plasma zone and the downstream reaction zone. A second gaseous material is then introduced to the downstream reaction zone. The first plasma zone-conditioned product is contacted with the second gaseous material within the downstream reaction zone. The geometry of the fluid passage at least upstream of the downstream reaction zone inhibits, or substantially inhibits, the supplied first electromagnetic energy from propagating from the first plasma zone to the downstream reaction zone.

In another aspect, there is provided method of processing a reaction product generated from a plasma-based reactive process, comprising: supplying a first electromagnetic energy, from a first energy source, to a flowing first gaseous feed material such that at least a fraction of the flowing first gaseous feed material is excited by the supplied first electromagnetic energy into a first plasma within a first plasma zone, and such that at least a fraction of the flowing first gaseous feed material is converted to a first plasma zone-conditioned product while flowing through the first plasma and the first plasma zone-conditioned product is flowed to a downstream reaction zone, wherein the flowing of the first plasma zone-conditioned product is effected through a fluid passage that effects fluid communication between the first plasma zone and the downstream reaction zone; and flowing a second gaseous material through a fluid passage defined by a fluid passage-defining conduit, to a combination zone, for effecting combination of the second gaseous material flow with the first plasma zone-conditioned product flow; wherein, upstream of the combination zone, at an upstream fluid passage portion of the fluid passage-defining conduit, the second fluid material flow is characterized by a pressure of $P_{SF1}$; wherein, upstream of the combination zone, the first plasma zone-conditioned product flow, with which the flowing second fluid material is combined, is characterized by a pressure $P_{FRP}$, wherein the pressure $P_{SF1}$ of the second fluid material flow is greater than the pressure $P_{FRP}$ of the first plasma zone-conditioned product flow; effecting a reduction in pressure of the second gaseous material flow from $P_{SF1}$, such that the second gaseous material flow becomes disposed at the pressure $P_{SF2}$ at an intermediate downstream fluid passage portion of the fluid passage-defining conduit, wherein the pressure $P_{SF2}$ is less than $P_{FRP}$, wherein the reduction is effected by conducting the second gaseous material flow from the upstream fluid passage portion to the intermediate downstream fluid passage portion, wherein the intermediate downstream fluid passage portion is characterized by a smaller cross-sectional area relative to the cross-sectional area of the upstream fluid passage portion, such that static pressure energy of the second gaseous material flow is converted to kinetic energy, and the pressure of the second gaseous material flow is reduced from $P_{SF1}$ to $P_{SF2}$, and such that the second gaseous material flow, characterized by the pressure $P_{SF2}$ and disposed at the intermediate downstream fluid passage portion, is disposed in fluid communication with the first plasma zone-conditioned product flow through a port that extends through the fluid passage-defining conduit and into the intermediate downstream fluid passage portion, such that the first plasma zone-conditioned product flow is induced to flow into the intermediate downstream fluid passage portion and combine with the flowing second gaseous material within the combination zone, in response to the differential between the pressure $P_{FRP}$ of the first plasma zone-conditioned product flow and the pressure $P_{SF2}$ of the second gaseous material flow; and combining the second gaseous material flow with the first plasma zone-conditioned product, within the combination zone, to generate a combined fluid material, in response to inducement to flow.

In another aspect, there is provided a method of processing a reaction product generated from a plasma-based reactive process. The method includes supplying a first electromagnetic energy, from a first energy source, to a flowing gaseous material such that at least a fraction of the flowing gaseous material is excited by the supplied first electromagnetic energy into a first plasma within an upstream plasma zone, and such that at least a fraction of the flowing gaseous material is converted to a first plasma zone-conditioned product while flowing through the first plasma and the first plasma zone-conditioned product is flowed to a downstream plasma zone, and supplying a second electromagnetic energy, from a second energy source, to the flowing first plasma zone-conditioned product such that at least a fraction of the flowing first plasma zone-conditioned product is excited by the supplied second electromagnetic energy into a second plasma within a downstream plasma zone, and such that at least a fraction of the flowing first reaction material is converted to a second reaction product while flowing through the second plasma. The flowing of the first plasma zone-conditioned product is effected through a fluid passage that effects fluid communication between the upstream plasma zone and the downstream plasma zone, wherein a geometry of the fluid passage at least upstream of the downstream plasma zone inhibits, or substantially inhibits, the supplied first electromagnetic energy from propagating from the upstream plasma zone to the downstream plasma zone.

DESCRIPTION OF DRAWINGS

The preferred embodiments of the invention will now be described with the following accompanying drawings, in which.

DETAILED DESCRIPTION

Figure 1:
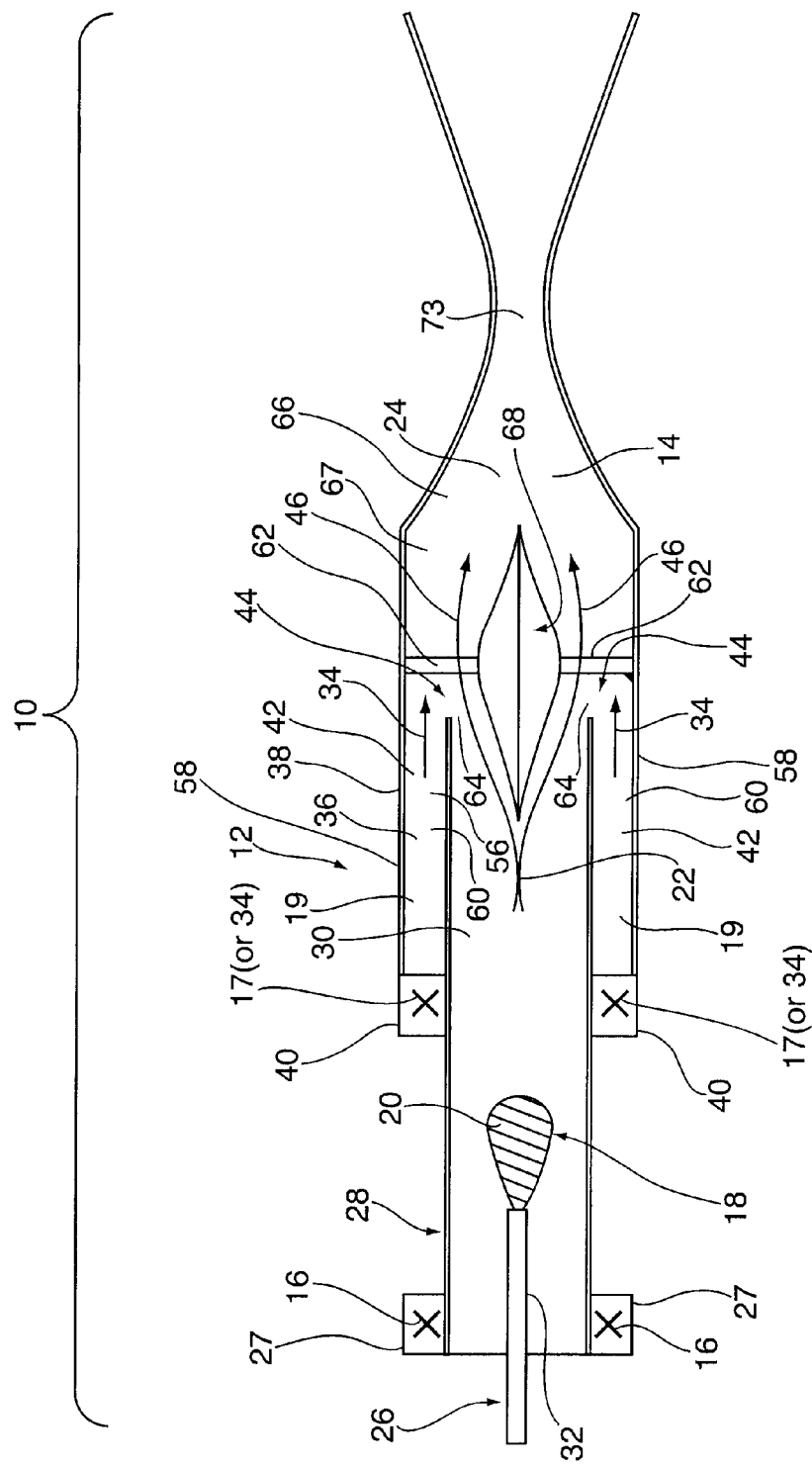
FIG 1 shows an example configuration of a plasma reactor system according to the disclosure.

Referring to FIGS. 1 to 7, a reactor system 10 is provided including a reactor 12. The reactor 12 includes a material processing zone 14. A primary gaseous feed material flow 16 is flowed through a first plasma zone 18 disposed within the material processing zone 14. A first electromagnetic energy, from a first energy source 26, is supplied to the primary gaseous feed material flow 16, while the primary gaseous feed material flow 16 is flowing through the first plasma zone 18, with the effect that at least a fraction of the primary gaseous feed material flow 16 is excited by the supplied first electromagnetic energy into a first plasma 20 within the first plasma zone 18, and at least a fraction of the primary gaseous feed material flow 16 is converted to a first plasma zone-conditioned product flow 22. The first plasma zone-conditioned product is in an excited state, relative to the primary gaseous feed material flow 16. In some embodiments, for example, the first energy source 26 includes a magnetron or other controllable source of electromagnetic energy.

In some embodiments, for example, the conversion of the at least a fraction of the primary gaseous feed material flow 16 to the first plasma zone-conditioned product flow 22 includes conversion effected by one or more reactive processes, with the effect that the conversion effects generation of a first reaction product derived from at least a fraction of the primary gaseous feed material flow 16, such that at least a fraction of the first plasma zone-conditioned product includes the first reaction product. In some of these embodiments, for example, at least a fraction of the one or more reactive processes are being effected while the primary gaseous feed material flow 16 is being flowed through the first plasma zone 18. In some of these embodiments, for example, at least a fraction of the one or more reactive processes are being effected downstream of the first plasma zone 18.

In some embodiments, for example, the conversion of the at least a fraction of the primary gaseous feed material flow 16 to the first plasma zone-conditioned product flow 22 includes conversion effected by heating, with the effect that the conversion effects generation of a heated primary gaseous material, such that at least a fraction of the first plasma zone-conditioned product includes the heated primary gaseous feed material flow.

In some embodiments, for example, the electromagnetic energy is microwave frequency energy, radio frequency energy, high frequency energy, ultra high frequency energy, or acoustic energy.

In some embodiments, for example, the reactor 12 includes a cylindrical, or substantially cylindrical first tube 28, for containing the primary gaseous material flow 16 and the first plasma zone-conditioned product flow 22. However, the reactor 12 may alternatively include a first tube of some other geometric configuration, such as square or rectangular, or some other regular or irregular polygonal shape. In this respect, a fluid passage 30, which is effecting fluid communication between the first plasma zone 18 and the downstream contacting zone 24, is provided within the first tube 28. One or more gas inlet ports 27 are provided within the first tube 28 for supplying the flow of the primary gaseous material 16. The gas inlet ports 27 are oriented so as to effect supplying of the primary gaseous material flow 16 in either an axial or tangential trajectory, relative to the central axis of the first tube 28.

To effect the supply of the first electromagnetic energy, in some embodiments, for example, an electrode 32 is mounted so as to be at least partially disposed within the first tube 28 and thereby act as an antenna or other radiator of supplied electromagnetic energy into first tube 28. The electrode 32 may be excited with an electromagnetic energy source of sufficient electrical field intensity so that the electromagnetic energy radiated into the first tube 28 by the electrode 32 has a sufficiently large field intensity as to effect excitation of at least a fraction of the primary gaseous material flow 16 so as to maintain a discharge plasma 20 within the first plasma zone 18, also disposed within the first tube. In some embodiments, for example, the electrode 32 may be configured with a hollow cylindrical shape so as to provide an additional gas inlet port into the first tube 28 through the interior space defined by the hollow electrode 32. In other embodiments, however, electrode 32 may be configured with a solid cylindrical shape.

I. Combining Reaction Product from First Plasma Zone with Another Fluid Material in a Downstream Contacting Zone Referring to FIGS. 1 to 6, in some embodiments, for example, the first plasma zone-conditioned product flow 22 is contacted with a second fluid material 34 within a downstream contacting zone 24, also disposed within the material processing zone 14 and in fluid communication with the first plasma zone 18.

In some of these embodiments, for example, the second fluid material 34 is a gaseous material. In some embodiments, for example, the second fluid material 34 is a flow of the second fluid material 34, and, in this respect, the second fluid material flow is conducted through a fluid passage 36, within the material processing zone 14, that effects fluid communication between the source of the second fluid material flow and the downstream contacting zone 24.

In some embodiments, for example, the reactor 12 is configured such that a cylindrical, or substantially cylindrical, second tube 38 is provided and includes one or more gas inlet ports 40 for supplying a gaseous material flow, which functions as the second fluid material 34, or from which the second fluid material is derived (as is further explained below). The first tube 28 is co-axially located within the second tube 38, with the second tube extending beyond the downstream end of the first tube 28. In some embodiments, the second tube 38 may have a cross-sectional geometry matched to but larger than that of the first tube 28, such that the first tube 28 and the second tube 38 may be axially co-located.

In some embodiments, for example, the second fluid material 34 is contacted with the first plasma zone-conditioned product flow 22 for effecting cooling of the first plasma zone-conditioned product flow.

In some embodiments, for example, the second fluid material 34 is contacted with the first plasma zone-conditioned product flow 22 for effecting dilution of the first plasma zone-conditioned product flow. In some embodiments, for example, the first plasma zone-conditioned product flow is diluted by the second fluid material to generate a diluted first plasma zone-conditioned product flow. In some of these embodiments, for example, the first plasma zone-conditioned product flow includes gaseous diatomic hydrogen, and the effected dilution is that of the first plasma zone-conditioned product, relative to the gaseous diatomic hydrogen.

Fluid containment components (including piping), that contain and/or conduct flowing fluids having relatively high concentrations of gaseous diatomic hydrogen, are designed to relatively high standards, for mitigating leakage of the contained fluid into the environment and thereby mitigate explosion risks. Such components are relatively expensive. In some embodiments, for example, some applications do not require relatively high concentrations of gaseous diatomic hydrogen. Accordingly, when supplying fluids to such end users, it would be useful to effect dilution of the first plasma zone-conditioned product, relative to the gaseous diatomic hydrogen, to generate the diluted first plasma zone-conditioned product, prior to conducting any fraction of the first plasma zone-conditioned product to the end user.

In some embodiments, for example, the concentration of gaseous diatomic hydrogen within the first plasma zone-conditioned product flow is relatively high, such as in excess of 90 volume % based on the total volume of the first plasma zone-conditioned product flow. In some of these embodiments, for example, the effected dilution is such that the generated diluted first plasma zone-conditioned product has a gaseous diatomic hydrogen concentration of less than 20 volume % based on the total volume of the diluted first plasma zone-conditioned product flow.

In some embodiments, for example, the second fluid material 34 is contacted with the first plasma zone-conditioned product flow 22 within the downstream contacting zone 24 for effecting conditioning of the first plasma zone-conditioned product flow 22. In this respect, in some of these embodiments, for example, the first plasma zone-conditioned product flow 22 includes at least one of carbon black-comprising particulate material and a carbon black-yielding material, and the second fluid material 34 includes an aggregation inhibition agent. Such contacting is with the effect that the aggregation inhibition agent inhibits carbon black material aggregation.

The carbon black-yielding material can be any material which, upon contacting with an operative transformation agent (which can be material, energy, or both material and energy), effects a reactive process which effects production of carbon black. In some embodiments, for example, the carbon black-yielding material includes one or more hydrocarbons. In some embodiments, for example, the carbon black-yielding material may be a liquid material, a gaseous material, or a mixture of a liquid material and a gaseous material. In some embodiments, for example, the carbon black-yielding material includes natural gas. In some embodiments for example, the carbon black-yielding material is natural gas. In some embodiments, for example, the carbon black-yielding material includes methane. In some embodiments for example, the carbon black-yielding material is methane.

Carbon black material aggregation means:
(a) aggregation between independent carbon black-comprising particulate materials, wherein each one of the independent carbon black-comprising particulate materials is one of: (i) carbon black-comprising particulate material of the first plasma zone-conditioned product flow 22, and (ii) carbon black-comprising particulate material that is generated from the carbon black-yielding material;
(b) aggregation between carbon black-comprising particulate and a previously formed carbon black-comprising aggregate material, the formation of which being effected by the aggregation defined in (a);
(c) aggregation between previously formed and independent carbon black-comprising aggregate materials, the formation of each of which being effected by the aggregation defined in (a); or
(d) any combination of (a), (b), and (c).

The generated carbon black-comprising particulate material may be generated from the carbon black-yielding material by at least partial conversion of the carbon black-yielding material within the downstream contacting zone 24, such as by pyrolytic decomposition of the carbon black-yielding material within the downstream contacting zone 24.

The supplying of the aggregation inhibition agent is particularly useful in circumstances where the pressure within the downstream contacting zone 24 is greater than 10 psig. Under these conditions, growth rate of the size of the carbon black-comprising aggregate materials is relatively faster than that at lower pressure conditions. Because growth rate of the size of carbon black-comprising aggregate materials is relatively faster at higher pressure conditions, controlling of the growth rate of the size of the carbon black-comprising aggregate materials, to recover a carbon black material product having a desired aggregate size, under these faster growing conditions, is more likely to be useful, thereby necessitating the supply of the aggregation inhibition agent.

In some embodiments, for example, the aggregation inhibition agent becomes associated with the carbon black-comprising particulate material or the carbon black-comprising aggregate material (resulting from the aggregation of the carbon black comprising particulate materials whose production is being effected by the at least partial conversion of the carbon black yielding material). Once associated, the aggregation inhibition agent functions to inhibit: (i) aggregation between independent carbon black-comprising particulate materials whose production is being effected by the at least partial conversion of the carbon black-yielding material, (ii) aggregation between carbon black-comprising particulate and a previously formed carbon black-comprising aggregate material, the formation of which is being effected by the aggregation of carbon black comprising particulate materials whose production is being effected by the at least partial conversion of the carbon black yielding material, or (iii) aggregation between previously formed and independent carbon black-comprising aggregate materials, the formation of each of which is being effected by the aggregation of carbon black comprising particulate materials whose production is being effected by the at least partial conversion of the carbon black yielding material, or (iv) any combination thereof.

In some embodiments, for example, the aggregation inhibition agent includes at least one Group IA (or its ionic form) of the Periodic Table, or at least one Group IIA element (or its ionic form) of the Periodic Table, or any combination of at least one Group IA (or its ionic form) of the Periodic Table and at least one Group IIA element (or its ionic form) of the Periodic Table. In some embodiments, for example, the aggregating inhibition agent includes at least one alkali metal, or at least one alkali metal ion, or at least one alkaline earth metal, or at least one alkaline earth metal ion, or any combination thereof. Suitable aggregation inhibition agents include lithium, sodium, potassium, rubidium, cesium, francium, calcium, barium, strontium, or radium, or their ionic forms, or any combination thereof. The aggregation inhibition agent may be a solid, liquid, or a gas, or any combination thereof. In some embodiments, for example, the aggregation inhibition agent may be a solution, such as an aqueous solution including dissolved potassium.

In some embodiments, for example, the aggregation inhibition agent becomes associated with the carbon black-comprising particulate material or the carbon black-comprising aggregate material as one or more metal ions, and the charge of the metal ions provides a repulsive force, inhibiting the aggregation between independent carbon black-comprising particulate materials, between carbon black-comprising particulate material and a previously formed carbon black-comprising aggregate material, or between previously formed and independent carbon black-comprising aggregate materials. By inhibiting this aggregation, characteristics of the produced carbon black-comprising product material may be tuned.

In some embodiments, for example, the contacting of the second fluid material 34 with the first plasma zone conditioned product flow 22 within the downstream contacting zone 24 is with the effect that conversion of the first plasma zone conditioned product flow 22 is effected, through one or more reactive processes, into a flowing second reaction product.

Figure 7:
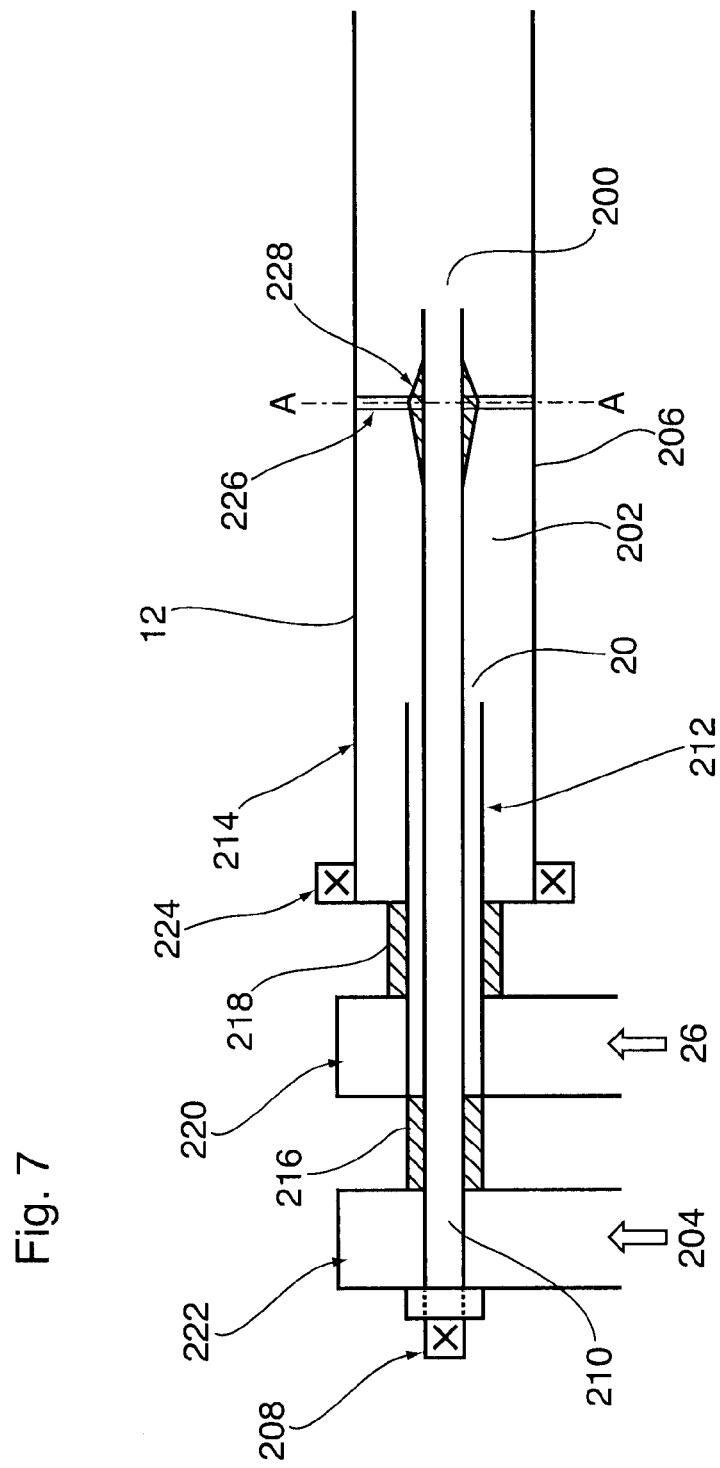
FIG 7 shows another example configuration of a plasma reactor system according to the disclosure, in which separate plasma processes are configured to be effected, in series.

Referring to FIG 7, in some of these embodiments, for example, a plasma 201 is generated within the downstream contacting zone 24 such that the downstream contacting zone 24 includes a downstream plasma zone 200, and the contacting of the second fluid material 14 with the first plasma zone conditioned product flow 22 is effected within the downstream plasma zone 200. In some embodiments, for example, the downstream plasma 201 is ignited by an electromagnetic energy source. In some embodiments, for example, the flow of the second fluid material 14 is combined with the first plasma zone conditioned product flow 22 within the downstream plasma zone 200, and the combined materials are excited by electromagnetic energy, supplied by a first energy source 26 to the downstream plasma zone 200, with the effect that at least a fraction of the combined material is excited by the supplied first electromagnetic energy into the downstream plasma 201 within the downstream plasma zone 200, and the one or more reactive process are effected. In some of these embodiments, for example, the plasma zone 18 is electromagnetically isolated, or substantially electromagnetically isolated, from the downstream plasma zone 200, such as by the embodiments described below.

Figure 2:
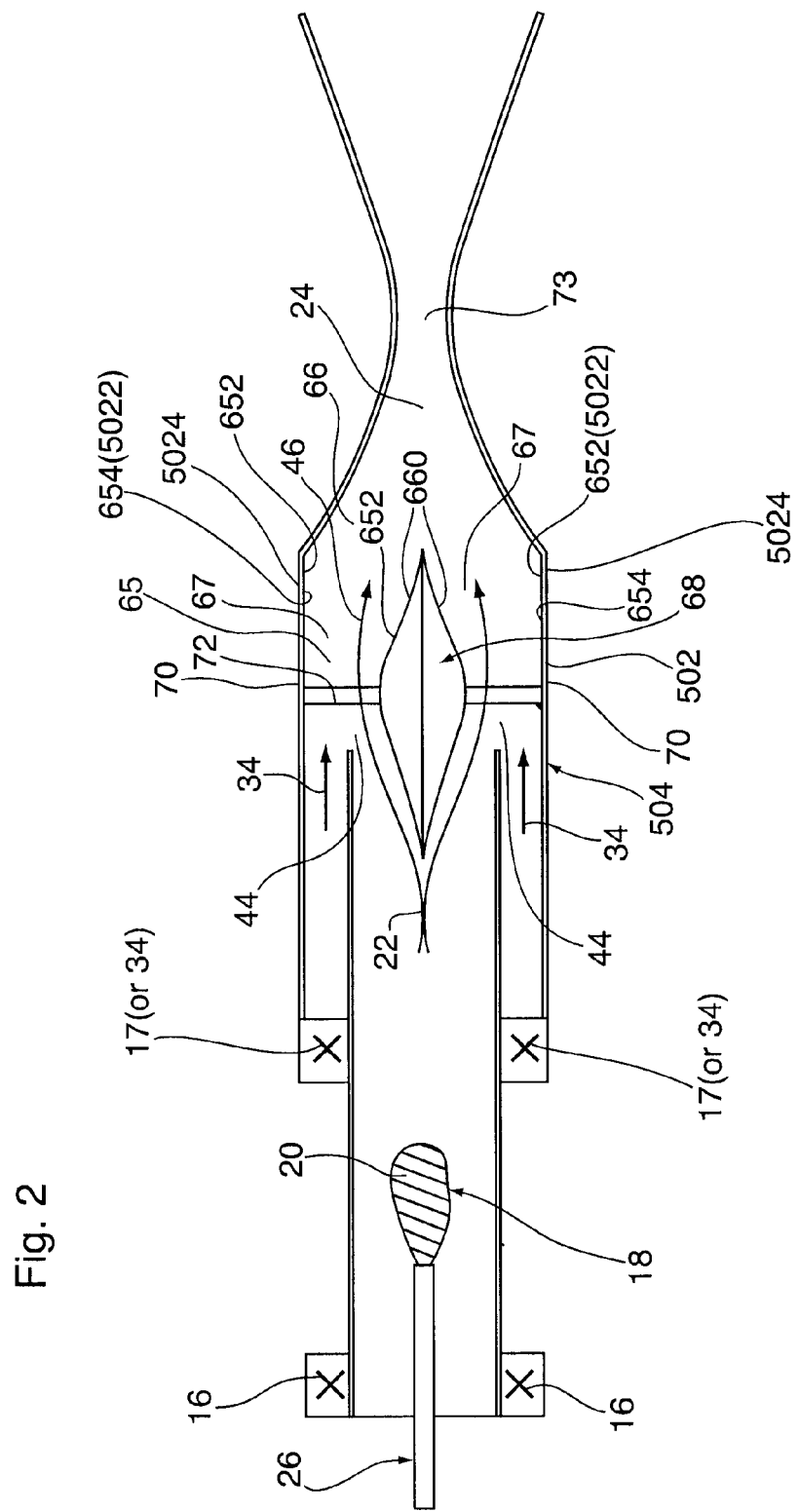
FIG 2 is identical to FIG 1, and more particularly identifies features downstream of the first plasma zone.

Referring to FIGS. 1 and 2, in some of these embodiments, for example, the second fluid material 34 is derived from a supplied secondary gaseous feed material flow 17, and the secondary gaseous feed material flow 17 includes excited gaseous feed material flow. In this respect, the gaseous material, being supplied by the gas inlet ports 40 within the second tube 38, is the secondary gaseous feed material flow 17. The secondary gaseous feed material flow 17 is flowed through a second plasma zone 19 disposed within the material processing zone 14. A second electromagnetic energy, from a second energy source, is supplied to the secondary gaseous feed material flow 17, while the secondary gaseous feed material flow 17 is flowing through the second plasma zone 19, with the effect that at least a fraction of the excitable gaseous feed material flow is excited by the supplied first electromagnetic energy into a second plasma within the second plasma zone 19, and at least a fraction of the excitable gaseous feed material flow is converted to a second plasma zone-conditioned product flow. In some embodiments, for example, the second fluid material 34 includes at least a fraction of the second plasma zone-conditioned product flow.

In some of these embodiments, for example, the primary gaseous material flow 16 includes carbon dioxide and methane, and the secondary gaseous feed material flow 17 includes carbon dioxide, methane, and water vapour. The flowing of the primary gaseous feed material flow 16 through the first plasma zone 18 effects conversion of at least a fraction of the primary gaseous material flow 16 into a first plasma zone conditioned product flow 22, defined by a first syngas product including gaseous diatomic hydrogen ($H_2$) and carbon monoxide (CO), wherein the ratio of moles of $H_2$ to moles of CO is between 1:2 and 2:1. The flowing of the secondary gaseous feed material flow 17 through the second plasma zone 19 effects conversion of at least a fraction of the secondary gaseous feed material flow 17 into a second plasma zone conditioned product flow 23, defined by a second syngas product including gaseous diatomic hydrogen ($H_2$) and carbon monoxide (CO), wherein the ratio of moles of $H_2$ to moles of CO is between 1:1 and 4:1. The first and second syngas products are combined within the downstream contacting zone 24 to generate the combined syngas product. Potential uses of the combined syngas product depends on the ratio of moles of $H_2$ to moles of CO within the combined syngas product. By having independent plasma operations, energy consumption can be optimized for the generation of a desired product composition. As well, overall process efficiencies may be optimised over a wide range of combined syngas product requirements and fluctuations in supplying of both of the primary gaseous feed material flow 16 and the secondary gaseous feed material flow 17.

In some embodiments, for example, the conversion of the excited secondary gaseous feed material flow 17 to the second plasma zone-conditioned product includes conversion effected by one or more reactive processes, with the effect that the conversion effects generation of a second reaction product derived from at least a fraction of the excited gaseous feed material flow, such that at least a fraction of the second plasma zone-conditioned product includes the second reaction product. In some of these embodiments, for example, at least a fraction of the one or more reactive processes are being effected while the excited gaseous feed material flow is being flowed through the second plasma zone 19. In some of these embodiments, for example, at least a fraction of the one or more reactive processes are being effected downstream of the second plasma zone 19.

In some embodiments, for example, the conversion of the at least a fraction of the excited gaseous feed material flow 17 to the second plasma zone-conditioned product includes conversion effected by heating, with the effect that the conversion effects generation of a heated excited gaseous feed material flow, such that at least a fraction of the second plasma zone-conditioned product includes the heated excited gaseous feed material flow.

In some embodiments, for example, the second energy source includes a magnetron or other controllable source of electromagnetic energy.

In some embodiments, for example, to effect the above-described plasma-based processes within the plasma zone 19, the second electromagnetic energy source may be coupled to the walls of the first tube 28. A coaxial transmission line section may thereby be formed comprising the first 28 and second tubes 30 and the annular region 42 defined therebetween, through which electromagnetic wave energy may propagate. Accordingly, while flowing the secondary gaseous feed material flow 17 through this annular region 42, and while the second electromagnetic energy is being supplied to the first tube 28 by the second electromagnetic energy source, the excited gaseous feed material flow of the secondary gaseous feed material flow 17 may be ignited through interaction with the electromagnetic fields within the annular region 42 such that a plasma discharge is effected, and such that the second plasma zone 19 is formed within this annular region 42.

In some embodiments, for example, the second fluid material 34 is combined with the first plasma zone-conditioned product flow 22, within a combination zone 44, to generate a combined fluid material flow 46. In this respect, contacting is effected between the second fluid material and the first plasma zone-conditioned product flow 22 through the combining, such that at least a fraction of the downstream contacting zone 24 is co-located with the combination zone 44. In some embodiments, for example, some of the downstream contacting zone 24 is disposed downstream of the combination zone 44.

IA. Inhibiting Propogation of Supplied Electromagnetic Energy

In one aspect, a geometry of a fluid passage 30, which is effecting fluid communication between the first plasma zone 20 and the downstream contacting zone 24, is spatially configured, at least upstream of the downstream contacting zone 24, such that the supplied first electromagnetic energy supply is inhibited, or substantially inhibited, from propagating from the first plasma zone 20 to the downstream contacting zone 24.

In some embodiments, for example, the spatial configuration of the fluid passage 30 is such that the first plasma zone 20 is electromagnetically isolated, or substantially electromagnetically isolated, from the downstream contacting zone 24, with effect that electromagnetic energy radiated into reactor tube 20 in a vicinity of the first plasma zone 20 is isolated, or substantially isolated, from the downstream contacting zone 24. In some embodiments, electromagnetic energy radiated in a vicinity of the first plasma zone 20 is substantially contained within the first plasma zone 20 and cannot propagate a substantial distance therebeyond down the reactor tube 12.

In some embodiments, for example, the spatial configuration of the fluid passage 30 is such that a cut-off frequency for transmission of electromagnetic wave energy is defined, and the frequency of the supplied energy is less than the cut-off frequency of the fluid passage 30.

In some embodiments, for example, the spatial configuration is such that an operative dimension, such as a radius or diameter (in the case of a circular geometry), or a height or width (in the case of a rectangular geometry), of the fluid passage 30, which is effecting fluid communication between the first plasma zone 20 and the downstream contacting zone 24, is defined, wherein the operative dimension (e.g., radius, diameter, height, or width, as the case may be) is sufficiently small, relative to a wavelength of supplied electromagnetic energy, such that the first plasma zone 20 is electromagnetically isolated, or substantially electromagnetically isolated, from the downstream contacting zone 24. In some of these embodiments, for example, the operative dimension defines a cut-off frequency for transmission of electromagnetic wave energy, and the frequency of the supplied energy is less than the cut-off frequency so as to ensure that the fluid passage 30 is operable as a cut-off waveguide.

Due to the cut-off condition of the fluid passage 30, the supplied first electromagnetic energy is inhibited from propagating as wave energy any significant distance downstream of the first plasma zone 20. In this respect, in those embodiments including the electrode 32, in some of these embodiments, for example, the spatial configuration is such that the plasma zone 20 is localized near the tip of the electrode.

In some embodiments, for example, the fluid passage 30, which is effecting fluid communication between the first plasma zone 20 and the downstream contacting zone 24, is defined within a conduit, and the material of the conduit is an electrical conductor. In some of these embodiments, for example, the conduit includes metallic material. In some embodiments, for example, the conduit is made from any one of steel, aluminium, copper, and alloys thereof. In some embodiments, for example, the conduit is made from alloys of steel including cobalt, nickel and chromium in proportions specifically designed to mitigate against carburization effects of high temperature operation.

In some embodiments, for example, the maximum distance between the first plasma zone 20 and the downstream contacting zone 24, measured along the longitudinal axis of the fluid passage 30, is less than 100 centimetres. In some of these embodiments, for example, the maximum distance between the first plasma zone 20 and the downstream contacting zone 24, measured along the longitudinal axis of the fluid passage 30 connecting the first plasma zone 20 and the downstream contacting zone 24, is less than 50 centimetres.

In some embodiments, for example, the time duration for transport of the first plasma zone-conditioned product flow 22 from the first plasma zone 20 to the downstream contacting zone 24 is less than 2.5 seconds. In some embodiments, for example, the time duration for transport of the first plasma zone-conditioned product flow 22 from the first plasma zone 20 to the downstream contacting zone 24 is less than 1.0 seconds.

In some embodiments, for example, the distance between the first plasma zone 20 and the downstream contacting zone 24 is pre-selected independently of the pre-selection of the supplied electromagnetic energy.

By providing a geometry of the fluid passage 30, which is effecting fluid communication between the first plasma zone 20 and the downstream contacting zone 24, that is spatially configured at least upstream of the downstream contacting zone such that the supplied first electromagnetic energy supply is inhibited, or substantially inhibited, from propagating from the first plasma zone 20 to the downstream contacting zone 24, it becomes possible, in at least some embodiments, to effect closer disposition of the downstream contacting zone 24 to the first plasma zone, while specifying the processes being effected within the downstream contacting zone 24, and controlling those processes, independently of the specification and control of the processes in the first plasma zone. By facilitating closer disposition of the downstream contacting zone 24 relative to the first plasma zone 20, thermal losses suffered by material, derived from the primary gaseous material flow 16, (including at least the first plasma zone-conditioned product, and, in some embodiments, for example, including unreacted or unconditioned primary gaseous material flow 16) while the material travels from the first plasma zone 20 to the downstream contacting zone 24, are mitigated, thereby better preserving the activity (or state of excitement) of the first plasma zone-conditioned product supplied to the downstream contacting zone 24.

In some embodiments, for example, the distance between the first plasma zone 20 and the downstream contacting zone 24 may be pre-selected with effect that the first plasma zone-conditioned product flow 22 is disposed above a predetermined minimum temperature when contacting the second fluid material within the downstream contacting zone 24. In some of these embodiments, for example, the disposition, of the first plasma zone-conditioned product flow 22, above that of the predetermined minimum temperature, is with effect that a desired outcome is effected by the contacting. In some of these embodiments, for example, the distance between the first plasma zone 20 and the downstream contacting zone 24 may also be pre-selected with effect that the first plasma zone-conditioned product flow 22 is disposed below a predetermined maximum temperature when contacting the second fluid material within the downstream contacting zone 24. In some of these embodiments, for example, the disposition, of the first plasma zone-conditioned product flow 22, above that of the predetermined minimum temperature, but below that of the predetermined maximum temperature, is with effect that a desired outcome is effected by the contacting.

In those embodiments where the contacting of the first plasma zone-conditioned product flow 22 with the second fluid material 34 within the downstream contacting zone 24 effects the generation of a second reaction product flow (and includes the conversion of at least a fraction of either one or both of the first plasma zone-conditioned product flow and the second fluid material 34), in some of these embodiments, for example, the first plasma zone 20 and the downstream contacting zone 24 are located in sufficient proximity to one another, such that at least a fraction of the thermal energy, generated within the plasma zone 20, is communicated to the contacting zone 24, for energizing the one or more reactive processes effected by contacting of the first plasma zone-conditioned product flow 22 and the second fluid material 34.

An example of a desired outcome resulting from the contacting of the first plasma zone-conditioned product flow 22 with the second fluid material 34 within the downstream contacting zone 24 is the excitation of a flow of second fluid material 34 of natural gas to a sufficient degree to effect decomposition of the methane but not so as to effect any substantial ionization, or even any ionization, of the methane. If ionization was induced, the generated product would include unacceptably high concentrations of acetylene, ethylene and other higher carbon-comprising compounds. In this respect, the flow of second fluid material 34 is contacted with the first plasma zone-conditioned product flow 22 within the downstream contacting zone 24 that is in close proximity to the first plasma zone 20, but sufficiently spaced apart from the first plasma zone 20 with effect that decomposition, but not ionization, of the methane is effected. In this respect, the temperature of the downstream contacting zone 24 is less than 1000 degrees Celsius. In some of these embodiments, for example, the temperature of the downstream contacting zone 24 is less than 700 degrees Celsius.

Figure 4:
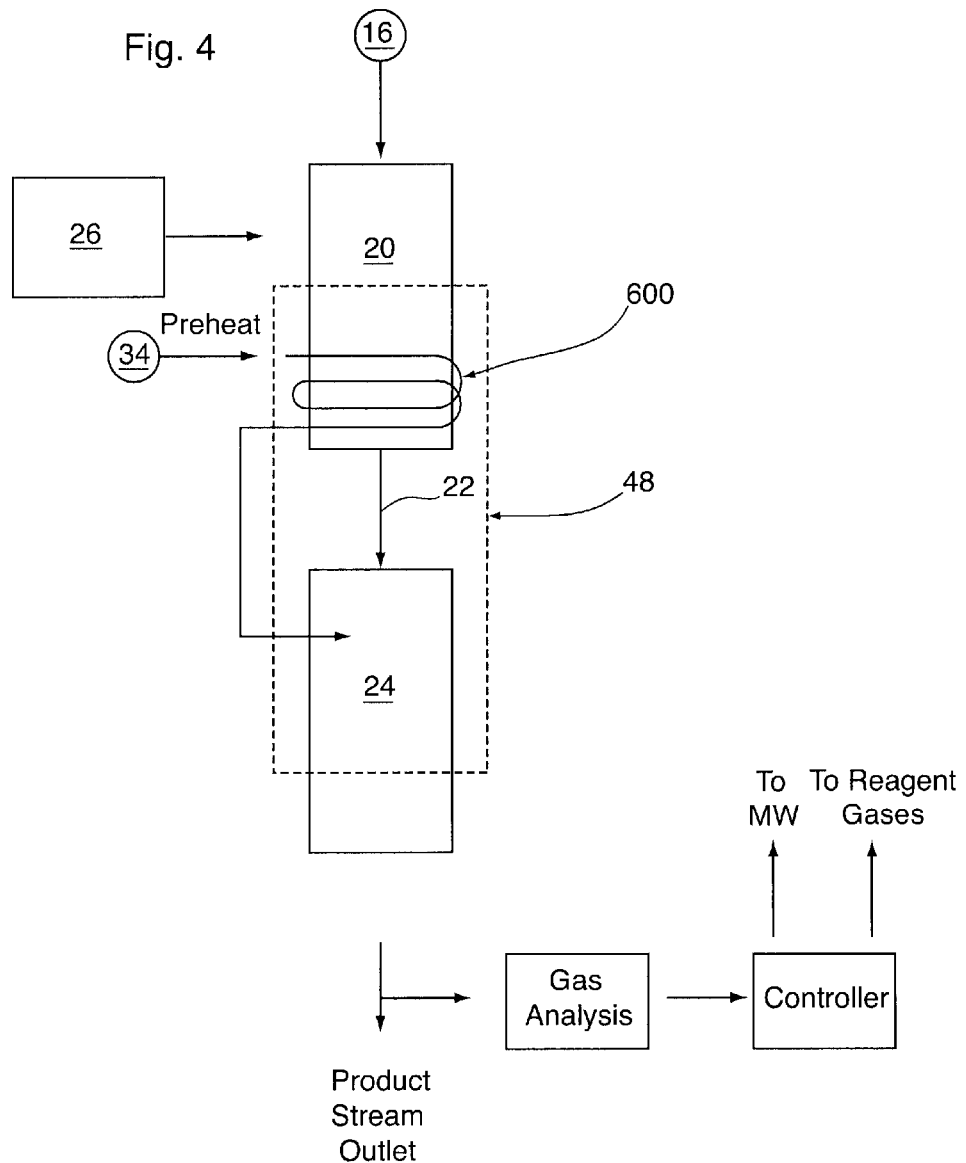
FIG 4 shows another example configuration of a plasma reactor system according to the disclosure, in which the reactor is insulated such that thermal energy generated in an upstream plasma zone is utilized for reactive processes in a downstream zone.
Figure 5:
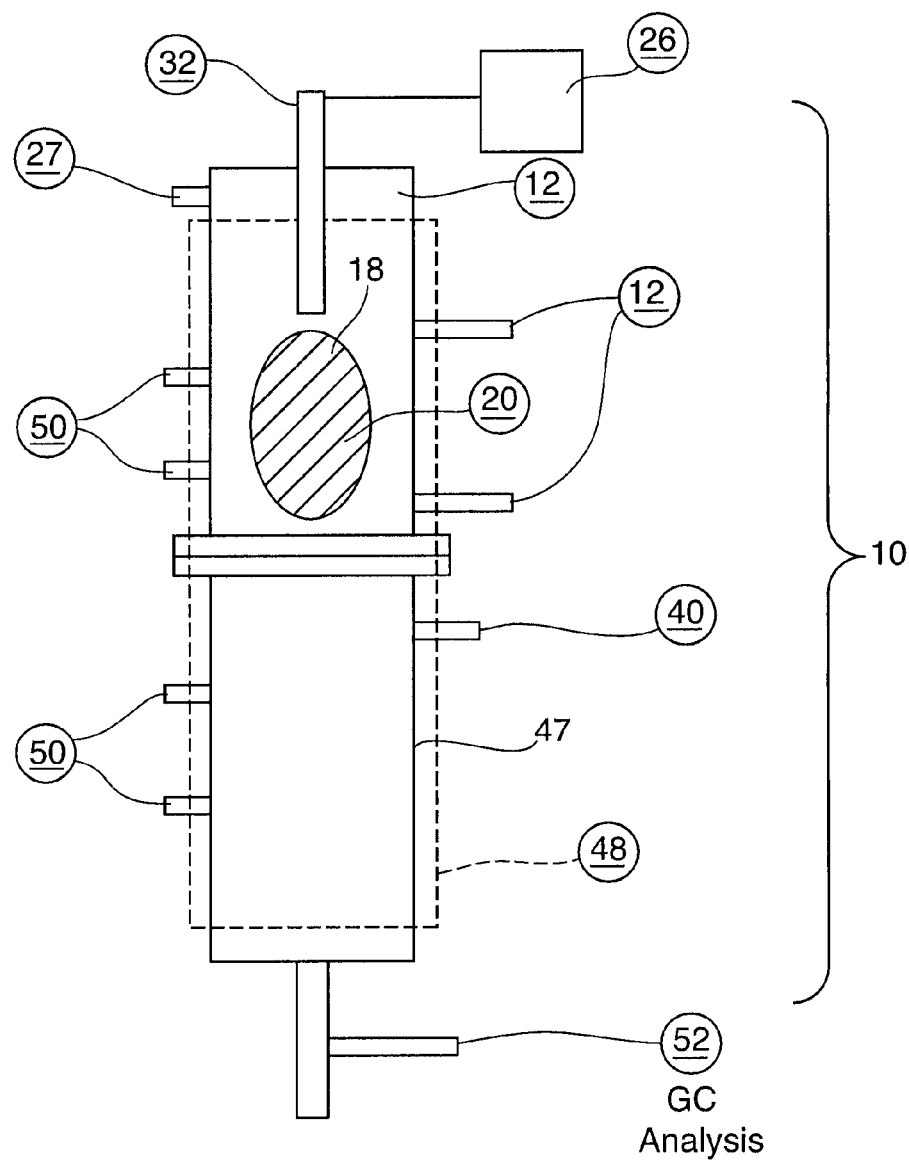
FIG 5 shows another example configuration of a plasma reactor system according to the disclosure, in which the reactor is insulated such that thermal energy generated in an upstream plasma zone is utilized for reactive processes in a downstream zone, and is also used to pre-heat a secondary fluid being supplied to the downstream zone.

Referring to FIGS. 4 and 5, for mitigating loss of thermal energy, generated within the first plasma zone 20, to the environment external to the material processing zone of the reactor 12, in some embodiments, for example, the reactor 12 is thermally insulated. In this respect, in some embodiments, for example, the reactor 12 includes a material processing zone-defining structure 47 (that defines the material processing zone 14), and an insulating material 48 is disposed about the external surface of the material processing zone-defining structure 47. In some embodiments, for example, the insulating material 48 includes ceramic paper products capable of withstanding operating temperatures of at least 1200 degrees Celsius. These materials are in sheet or blanket form and may be cut and formed around the reactor and associated pipe and fittings. These materials, typically built up in layers of approximately one (1) inch in thickness, are configured to prevent heat loss to the extent that the temperature within the downstream contacting zone 24 is above a predetermined minimum temperature. In some embodiments, for example, while generation of the first plasma zone-conditioned product flow 22 is being effected and supplied to the downstream contacting zone 24, and while the second fluid material 34 including methane, is being supplied to the downstream contacting zone 24, the insulating material is configured to provide sufficient insulation with effect that the temperature of the downstream contacting zone 24 is greater than 500 degrees Celsius, such as greater than 700 degrees Celsius.

In some embodiments, for example, thermal energy, generated within the first plasma zone 20, is indirectly communicated to the flow of second fluid material 34, prior to supplying the flow of the second fluid material 34 to the downstream contacting zone 24, for effecting heating of the second fluid material 34. In some of these embodiments, for example, the rate of transfer of thermal energy from the first plasma zone 20 to the second fluid material flow 34, is with effect that, prior to supplying the flow of the second fluid material 34 to the downstream contacting zone 24, the temperature of the flow of the second fluid material 34 is below a predetermined maximum temperature. In some embodiments, for example, the second fluid material 34, being flowed, includes methane, and the second fluid material 34 is being supplied to the downstream contacting zone 24 for effecting the decomposition of methane in a pyrolysis process. In this respect, prior to supplying the flow of the second fluid material 34 to the downstream contacting zone 24, thermal energy generated within the first plasma zone 20 is indirectly communicated to the second fluid material such that the temperature of the flow of the second fluid material 34, prior to its supply to the downstream contacting zone 24, is below 700 degrees Celsius, such as below 500 degrees Celsius (so as to mitigate premature decomposition of methane prior to its supply to the downstream contacting zone 24), and also is above 100 degrees Celsius, such as above 300 degrees Celsius.

In some embodiments, for example, the indirect communication of the thermal energy is effected by flowing the second fluid material 34 within a tubing coil 600 wrapped around the external wall surface, of the reactor 12, in close proximity to the plasma zone 20, thereby effecting heat transfer from the reactor wall to the second fluid material 34.

In some embodiments, for example, reactor operation may be adjusted for various operating conditions by controlling the supply of the primary gaseous material flow 16, the supply of the second fluid material flow 34, and the power level of the supplied electromagnetic energy. In this respect, temperature sensors 50 and a gas composition analyzer 52 (such as a gas chromatograph) are provided for sensing, respectively, temperature and material concentration. The various sensors sense these parameters and transmit representative signals to a controller which modulates the power level of the supplied electromagnetic energy, as well as the rate of supply of the primary gaseous flow 16 and the supply of the second fluid material flow 34.

Figure 6:
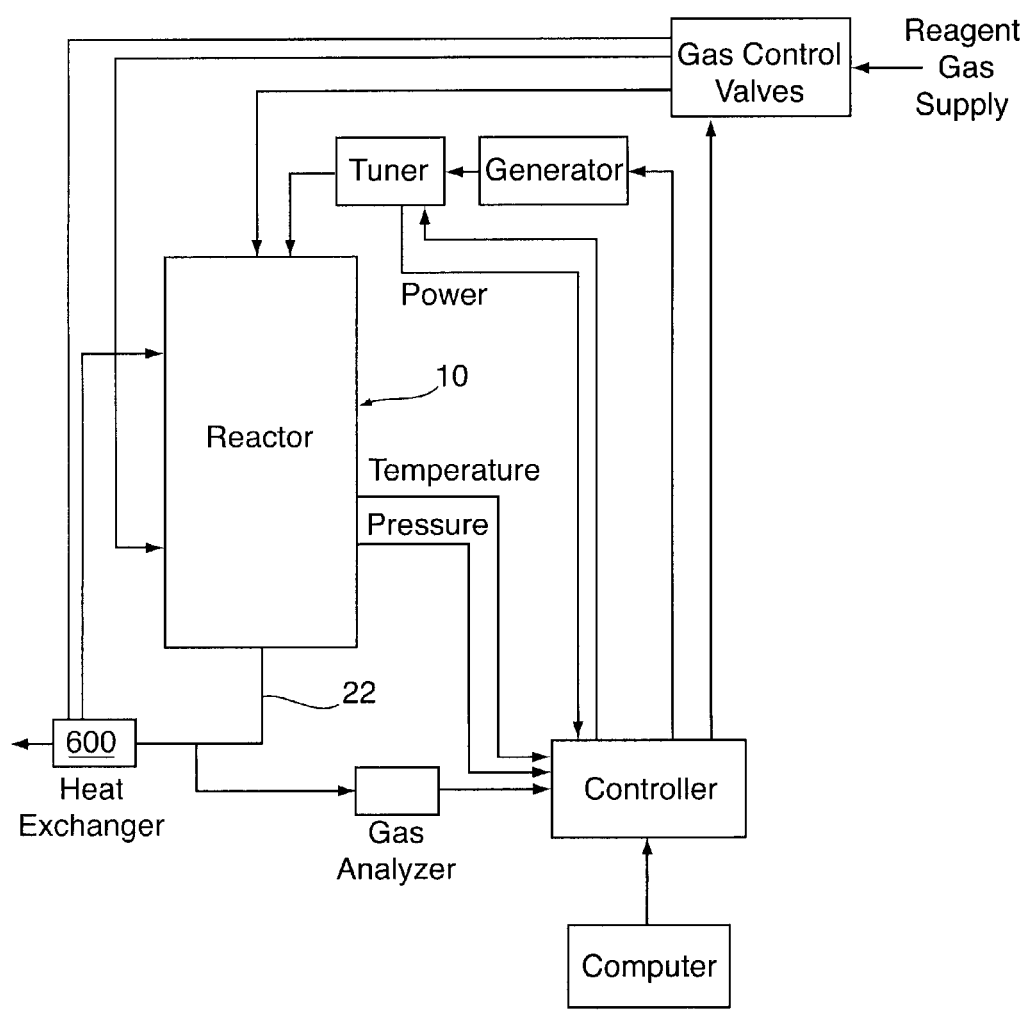
FIG 6 shows an exemplary process control scheme for an example configuration of a plasma reactor system according to the disclosure.

An example process control scheme is shown in FIG 6. The reactor vessel 12 is fitted with electronic sensors that transmit temperature and pressure information to an electronic controller, for example a Programmable Logic Controller (PLC) or a computer. In addition, the first plasma zone-conditioned product flow 22 may be automatically sampled and analysed by a gas chromatograph or similar instrument calibrated to transmit electronic information to the controller concerning gas product constituents, for example gas molar composition.

The controller is electronically connected to, for example, the inlet gas flow valves, the microwave generator and the microwave tuner such that the controller can control each of these devices through their respective operating ranges.

For example, in some cases, the controller may receive temperature information from the first plasma zone-conditioned product flow 22 and may direct second fluid material flow 34 to a heat transfer element located on the product gas conduit in order to transfer useful heat energy into the second fluid material flow 34. In another example, the controller may receive temperature information from the downstream contacting zone 24 of the reactor (the plasma tail region) and may direct the inflow of second fluid material flow 34 into this downstream contacting zone 24 for the purpose of using the latent heat content of the product gas stream to effect further chemical reaction within the downstream contacting zone 24, for example the thermal pyrolysis of methane (supplied by the second fluid material 34) to produce hydrogen.

The controller may be logically programmed to respond to the information inputs in such a way as to controllably effect a set of desirable outcomes in the operation of the reactor and its associated systems. For example, the controller may automatically adjust the microwave tuner to maintain maximum power transfer from the microwave generator to the reactor. For example, the controller may adjust the microwave power level to maintain a specified set of reactor temperature set-points. For example, the controller may adjust the reagent gas valves to maintain a specified composition of the first plasma zone-conditioned product flow 22.

In some of those embodiments where at least a fraction of the second fluid material 34 includes the second reaction product, generated from the second plasma zone 19, the second plasma zone 19 is electromagnetically isolated, or substantially electromagnetically isolated from the first plasma zone 20.

For those embodiments where the second plasma zone 19 is electromagnetically isolated, or substantially electromagnetically isolated, from the first plasma zone 20, in some of these embodiments, for example, the electromagnetic isolation is effected by effecting disposition of the source of the second electromagnetic energy at a sufficient distance from the first plasma zone 20.

Also for those embodiments where the second plasma zone 19 is electromagnetically isolated, or substantially electromagnetically isolated from the first plasma zone 20, in some of these embodiments, for example, a geometry of the fluid passage 30, which is effecting fluid communication between the first plasma zone 20 and the downstream contacting zone 24, is spatially configured at least upstream of the downstream contacting zone 24 such that the supplied second electromagnetic energy is inhibited, or substantially inhibited, from propagating from the second plasma zone to the first plasma zone 20. In some embodiments, for example, the spatial configuration is such that the second plasma zone is electromagnetically isolated, or substantially electromagnetically isolated, from the first plasma zone. In some embodiments, for example, the spatial configuration is such that a cut-off frequency for transmission of electromagnetic wave energy is defined, and the frequency of the supplied second electromagnetic energy is less than the cut-off frequency. In some embodiments, for example, the spatial configuration is such that an operative dimension, such as a radius or diameter (in the case of a circular geometry), or a height or a or a width (in the case of the rectangular geometry), of the fluid passage 30, which is effecting fluid communication between the first plasma zone 20 and the downstream contacting zone 24, is defined, wherein the respective operative dimension (e.g., radius, diameter, height, or width, as the case may be), is sufficiently small such that the second plasma zone is electromagnetically isolated, or substantially electromagnetically isolated, from the first plasma zone. In some of these embodiments, for example, the respective operative dimension defines a cut-off frequency for transmission of electromagnetic wave energy, and the frequency of the supplied second electromagnetic energy is less than the cut-off frequency. In some embodiments, for example, the fluid passage 30, which is effecting fluid communication between the first plasma zone 20 and the downstream contacting zone 24, is defined within a conduit, and the material of the conduit is an electrical conductor, such as a metallic material.

In some of those embodiments where at least a fraction of the second fluid material 34 includes the second reaction product, generated from the second plasma zone, the second plasma zone is electromagnetically isolated, or substantially electromagnetically isolated from the downstream contacting zone 24.

For those embodiments where the second plasma zone 19 is electromagnetically isolated, or substantially electromagnetically isolated, from the downstream contacting zone 24, in some of these embodiments, for example, the electromagnetic isolation is effected by effecting disposition of the source of the second electromagnetic energy at a sufficient distance from the downstream contacting zone 24.

Also for those embodiments where the second plasma zone 19 is electromagnetically isolated, or substantially electromagnetically isolated, from the downstream contacting zone 24, in some of these embodiments, for example, a geometry of the fluid passage 54, which is effecting fluid communication between the second plasma zone and the downstream contacting zone 24, is spatially configured at least upstream of the downstream contacting zone 24 such that the supplied second electromagnetic energy is inhibited, or substantially inhibited, from propagating from the second plasma zone to the downstream contacting zone 24. In some embodiments, for example, the spatial configuration is such that the second plasma zone 19 is electromagnetically isolated, or substantially electromagnetically isolated, from the downstream contacting zone 24. In some embodiments, for example, the spatial configuration is such that a cut-off frequency for transmission of electromagnetic wave energy is defined, and the frequency of the supplied second electromagnetic energy is less than the cut-off frequency. In some embodiments, for example, the spatial configuration is such that an operative dimension, such as a radius or diameter (in the case of a circular geometry), or a height or width (in the case of a rectangular geometry), of the fluid passage 54, which is effecting fluid communication between the second plasma zone 19 and the downstream contacting zone 24, is defined, wherein the operative dimension (e.g., radius, diameter, height, or width, as the case may be), is sufficiently small, relative to a wavelength of supplied electromagnetic energy, such that the second plasma zone 19 is electromagnetically isolated, or substantially electromagnetically isolated, from the downstream contacting zone 24. In some of these embodiments, for example, the operative dimension (e.g., radius, diameter, height, or width, as the case may be) defines a cut-off frequency for transmission of electromagnetic wave energy, and the frequency of the supplied second electromagnetic energy is less than the cut-off frequency. In some embodiments, for example, the fluid passage 54, which is effecting fluid communication between the second plasma zone and the downstream contacting zone, is defined within a conduit, and the material of the conduit is an electrical conductor.

IB. Mitigating Transport of Second Fluid Material to the First Plasma Zone

Figure 3:
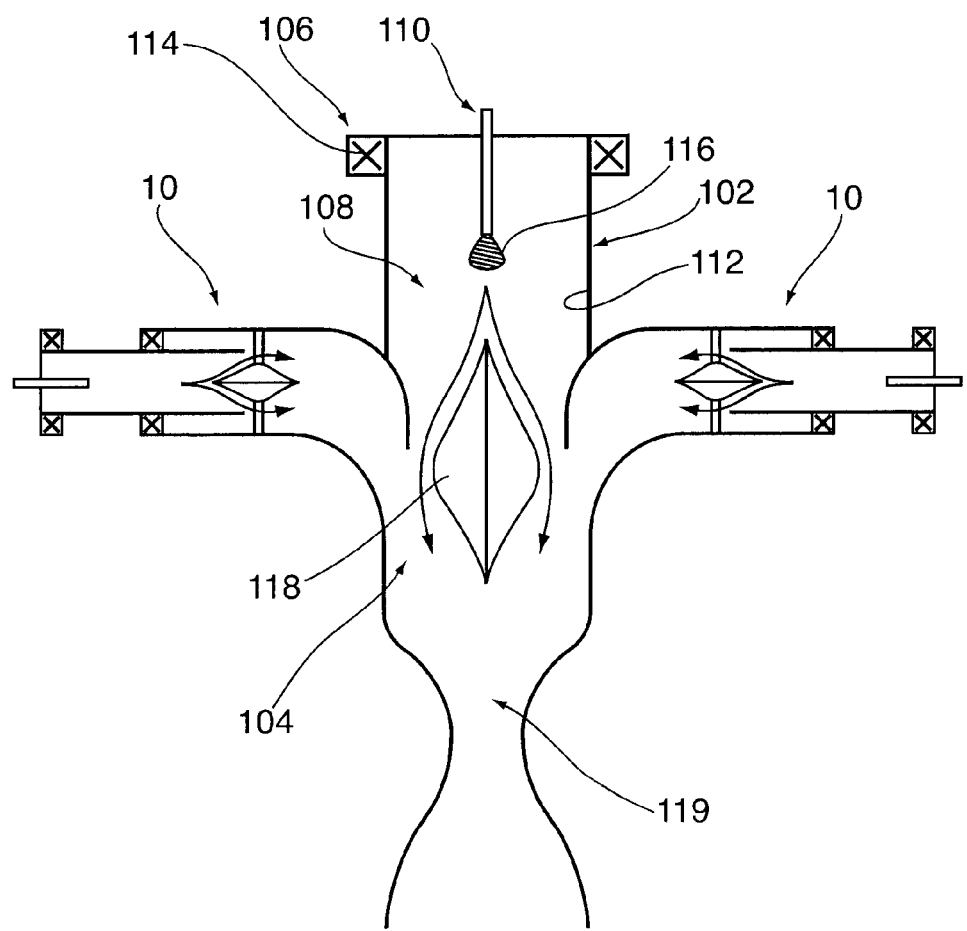
FIG 3 shows another example configuration of a plasma reactor system according to the disclosure, in which multiple units of the plasma reactor system as shown in FIG 1 are coupled together.

In another aspect, and referring specifically to FIGS. 1 to 3, the second fluid material 34 is combined with the first plasma zone-conditioned product flow 22 within a combination zone 24. In this respect, the flow of second fluid material 34 is provided and is conducted through a fluid passage 56, defined by a fluid passage-defining conduit 58, to the combination zone 44. Upstream of the combination zone 44, at an upstream fluid passage portion 60, the second fluid material flow is characterized by a pressure of $P_{SF1}$. Upstream of the combination zone 44, the first plasma zone-conditioned product flow 22, with which the flowing second fluid material 34 is combined, is characterized by a pressure $P_{FPP}$. The pressure $P_{SF1}$ of the second fluid material flow (upstream of the combination zone) is greater than the pressure $P_{FPP}$ of the first plasma zone-conditioned product flow (upstream of the combination zone). Pressure of the flow of second fluid material 34 is reduced from $P_{SF1}$, such that the flow of secondary material fluid 34 becomes disposed at the pressure $P_{SF2}$ at the combination zone 44, wherein the pressure $P_{SF2}$ is less than $P_{FPP}$. The reduction is effected by conducting the flow of second fluid material 34 from the upstream fluid passage portion 60 to the combination zone 44, wherein a combination zone-defining fluid passage portion 62, within which the combination zone 44 is disposed, is characterized by a smaller cross-sectional area relative to the cross-sectional area of the upstream fluid passage portion 60. By conducting the flow of the second fluid material 34 from the upstream fluid passage portion 60 to the combination zone-defining fluid passage portion 62, static pressure energy is converted to kinetic energy, and the pressure of the flow of second fluid material 34 is reduced from $P_{SF1}$ to $P_{SF2}$. The flow of second fluid material, characterized by the pressure $P_{SF2}$ and disposed at the combination zone-defining fluid passage portion 62, is disposed in fluid communication with the first plasma zone-conditioned product flow 22 through a port or passage 64 that extends into the combination zone 44, such that the first plasma zone-conditioned product flow 22 is induced to flow (or "be conducted") into the combination zone 44 and combine with the flowing secondary gaseous material 34 within the combination zone 44, in response to the differential between the pressure $P_{FPP}$ of the first plasma zone-conditioned product flow 22 and the pressure $P_{SF2}$ of the flow of the second fluid material 34. The combining of the first plasma zone-conditioned product flow 22 and the flow of the secondary gaseous material 34 effects generation of a combined fluid material flow 46.

In some embodiments, for example, downstream of the combination zone 44, the pressure of the combined fluid material flow 46 is increased to pressure $P_{CFMF}$. In some embodiments, for example, the pressure $P_{CFMF}$ is greater than the pressure $P_{FPP}$. The pressure increase is effected by flowing the combined material 46 from the combination zone-defining fluid passage portion 62 to a "kinetic energy to static pressure energy conversion" downstream fluid passage portion 66. The cross-sectional area of the "kinetic energy to static pressure energy conversion" downstream fluid passage portion 66 is greater than the cross-sectional area of the combination zone-defining fluid passage portion 62, such that kinetic energy of the flowing combined fluid material 46 disposed within the combination zone-defining fluid passage portion 64 is converted into static pressure energy when the flowing combined fluid material 46 becomes disposed in the "kinetic energy to static pressure energy conversion" downstream fluid passage portion 66 by virtue of the fact that the flowing combined fluid material 46 has become conducted to a fluid passage portion with a larger cross-sectional area.

The fluid passage network, described above, which induces the combining of the combining of the first plasma zone-conditioned product flow 22 and the flow of the secondary gaseous material 34, for effecting generation of the combined fluid material flow 46 is referred to herein as the "Venturi region", and the effected combining will hereinafter be referred to as the "Venturi effect". In some embodiments, for example, such fluid passage network is defined by an eductor.

In some embodiments, for example, a converging nozzle portion of a fluid passage defines the upstream fluid passage portion 60 and a diverging nozzle portion of the fluid passage defines the "kinetic energy to static pressure energy conversion" downstream fluid passage portion 66, and the intermediate downstream fluid passage portion 64 is disposed intermediate of the converging and diverging nozzle portions. In some embodiments, for example, the combination of the upstream fluid passage portion 60 and the "kinetic energy to static pressure energy conversion" downstream fluid passage portion 66 is defined by a Venturi nozzle.

By configuring the fluid dynamics in this manner, amongst other things, conducting (or "flowing") of the second fluid material 34, to the first plasma zone 20, is mitigated. Rather, conducting (or "flowing") of the second fluid material, along with the first plasma-conditioned zone product flow 22, is directed towards the downstream contacting zone 24.

Referring to FIG 2, in some embodiments, for example, the combination zone 44 is connected to the downstream contacting zone 24 with an intermediate fluid passage section 65. The intermediate fluid passage section 65 is defined by an intermediate fluid passage section-defining surface 652. The intermediate fluid passage section 65 includes the combination zone-defining fluid passage portion 62 (and, in some embodiments, for example, also includes the "kinetic energy to static pressure energy conversion" downstream fluid passage portion 66).

The intermediate fluid passage section-defining surface 652 includes a heat sink-defining surface portion 654. The heat sink-defining surface portion 654 is defined as that portion, of the intermediate fluid passage section-defining surface 652, which defines a internal surface portion 5022 of a wall portion 502 of a reaction vessel 504, relative to which a corresponding opposite external surface portion 5024 of the wall portion 502 is disposed in heat transfer communication with a heat sink fluid, the heat sink fluid having a heat sink fluid temperature that is lower than the temperature of the first plasma zone-conditioned product flow 22, taken as the first plasma zone-conditioned product flow 22 is entering the combination zone 44, by at least 200 degrees Celsius, such as, for example, at least 300 degrees Celsius, or, such as, for example, at least 400 degrees Celsius. In some embodiments, for example, the heat sink fluid is the atmosphere.

In some embodiments, for example, the second fluid material 34 functions as a thermal insulator, and the intermediate fluid passage section-defining surface 652 is shaped with effect that, while the generation of the first plasma 20, within the first plasma zone 16, is being effected, and while the generation of the first plasma zone-conditioned product flow 22 is being effected in response to the flowing of the primary gaseous material flow 16 through the first plasma zone 18, and while the first plasma zone-conditioned product flow 22 is being supplied to the intermediate fluid passage section 65, and while the supplied first plasma zone-conditioned product flow 22 is being combined with the flow of the secondary gaseous material 34 within the combination zone 44 of the intermediate fluid passage section 65 to generate the combined fluid material flow 46, and while the combined fluid material flow 46 is being flowed through the intermediate fluid passage section 65, the first plasma zone-conditioned product flow 22 is not mixed with the flow of the secondary gaseous material 34 within the intermediate fluid passage section 65 to a sufficient extent so as to effect sufficient heat transfer from the combined fluid material flow 46 and across the heat sink-defining surface portion 654, such that the temperature of the combined fluid material flow 46, that is disposed adjacent to the heat sink-defining surface portion 654, is exceeded by the temperature of the first plasma zone-conditioned product flow 22, taken as the flow 22 is entering the combination zone 44, by at least 200 degrees Celsius, such as, for example, at least 400 degrees Celsius, or, such as, for example, at least 500 degrees Celsius. In some embodiments, for example, the heat sink-defining surface portion 654 is defined by iron-comprising material, such as stainless steel, thereby rendering the surface portion 654 vulnerable to carburization. In some embodiments, for example, that the temperature of the combined fluid material flow 46, that is disposed adjacent to the heat sink-defining surface portion 654, is exceeded by the temperature of the first plasma zone-conditioned product flow 22, taken as the flow 22 is entering the combination zone 44, by at least 200 degrees Celsius, such as, for example, at least 300 degrees Celsius, or, such as, for example, at least 400 degrees Celsius. In some embodiments, for example, the temperature of the first plasma zone-conditioned product flow 22, taken as the flow 22 is entering the combination zone 44, is at least 500 degrees Celsius. In some of these embodiments, for example, the temperature of the first plasma zone-conditioned product flow 22, taken as the flow 22 is entering the combination zone 44, is at least 700 degrees Celsius. In some of these embodiments, for example, the temperature of the first plasma zone-conditioned product flow 22, taken as the flow 22 is entering the combination zone 44, is at least 800 degrees Celsius. In some of these embodiments, for example, within the combination zone 44, that portion of the combined fluid material flow 46, that is disposed in adjacent relationship to a portion 660 of the intermediate fluid passage section-defining surface 652 that is opposite to the heat sink-defining surface portion 654, is defined, or substantially defined, by the first plasma zone-conditioned product flow 22, and the flowing second fluid material 34 is introduced to the intermediate fluid passage section 65 with effect that, within the combination zone 44, the portion of the combined fluid material flow 46 that is disposed in adjacent relationship to a portion of the heat sink-defining surface portion 654, is defined, or substantially defined, by the flow of the second fluid material 34. By mitigating heat transfer from the combined fluid material flow 46 and across the heat sink-defining surface portion 654, improved efficiency of the communication of thermal energy, generated within the plasma zone 20, to the contacting zone 24, for energizing the one or more reactive processes effected by the contacting of the first plasma zone-conditioned product flow and the second fluid material, is facilitated. Also, in some embodiments, for example, such mitigation of heat transfer reduces the risk of carburization of the heat sink-defining surface portion 654.

In some embodiments, for example, the second fluid material functions as a material transfer inhibitor (inhibits transfer of carbon-comprising particulate material to the heat sink-defining surface portion 654), and the intermediate fluid passage section-defined surface 652 is shaped with effect that, while the generation of the first plasma 20, within the first plasma zone 16, is being effected, and while the generation of the first plasma zone-conditioned product flow 22 is being effected in response to the flowing of the primary gaseous material flow 16 through the first plasma zone 18, and while the first plasma zone-conditioned product flow 22 is being supplied to the intermediate fluid passage section 65, and while the supplied first plasma zone-conditioned product flow 22 is being combined with the flow of the second fluid material 34 within the combination zone 44 of the intermediate fluid passage section 65 to generate the combined fluid material flow 46, and while the combined fluid material flow 46 is being flowed through the intermediate fluid passage section 65, the first plasma zone-conditioned product flow 22 is not mixed with the flow of the second fluid material 34 within the intermediate fluid passage section 65 to a sufficient extent so as to effect transport of carbon-comprising particulate material generated within the first plasma zone towards the heat sink-defining surface portion 654, such that at least 90 weight % of carbon-comprising particulate material within the intermediate fluid passage section 65, based on the total weight of carbon-comprising particulate material that is disposed within the intermediate fluid passage section 65, is spaced apart from heat sink-defining surface portion 654 by a minimum distance of at least four (4) centimetres. In some of these embodiments, for example, within the combination zone 44, that portion of the combined fluid material flow 46, that is disposed in adjacent relationship to a portion 660 of the intermediate fluid passage section-defining surface 652 that is opposite to the heat sink-defining surface portion 654, is defined, or substantially defined, by the first plasma zone-conditioned product flow 22, and the flowing second fluid material 34 is introduced to the intermediate fluid passage section 65 with effect that, within the combination zone 44, the portion of the combined fluid material flow 46 that is disposed in adjacent relationship to a portion of the heat sink-defining surface portion 654, is defined, or substantially defined, by the flow of the second fluid material 34. In some embodiments, for example, such effect reduces the risk of carburization of the heat sink-defining surface portion 654. In some embodiments, for example, the heat sink-defining surface portion 654 is defined by an iron-comprising material, such as stainless steel, which is susceptible to carburization.

In some embodiments, for example, the secondary gaseous material 34 functions as a cooling fluid for effecting cooling of the first plasma zone-conditioned product flow 22, and the intermediate fluid passage section-defined surface 652 is shaped with effect that, while the generation of the first plasma 20, within the first plasma zone 16, is being effected, and while the generation of the first plasma zone-conditioned product flow 22 is being effected in response to the flowing of the primary gaseous material flow 16 through the first plasma zone 18, and while the first plasma zone-conditioned product flow 22 is being supplied to the combination zone 44 of the intermediate fluid passage section 65, and while the supplied first plasma zone-conditioned product flow 22 is being combined with the flow of the secondary gaseous material 34 within the intermediate fluid passage section 65 to generate the combined fluid material flow 46, and while the combined fluid material flow 46 is being flowed through the intermediate fluid passage section 65, the first plasma zone-conditioned product flow 22 is mixed with the flow of the secondary gaseous material 34 within the combination zone 44 of the intermediate fluid passage section 65 to a sufficient extent such that the temperature, of the combined fluid material flow 46 that is: (a) spaced-apart from the heat sink-defining surface portion 654 by a minimum distance of at least four (4) centimetres, such as, for example, at least eight (8) centimetres, or such as, for example, at least 10 centimetres, and (b) disposed within a fluid passage cross-section, of the intermediate fluid passage section 65, disposed downstream from the downstream combination zone, by an axial distance ("AD") of less than four (4) centimetres, such as, for example, less than eight (8) centimetres, or such as, for example, less than 10 centimetres, is exceeded by the temperature of the flow of the first plasma zone-conditioned product flow 22, taken as the first plasma zone-conditioned product flow is entering the combination zone 44, by at least 200 degrees Celsius, such as, for example, at least 300 degrees Celsius, or such as, for example, at least 400 degrees Celsius. In some embodiments, for example, the temperature of the first plasma zone-conditioned product flow 22, taken as the product flow 22 is entering the combination zone 44, exceeds the temperature of the flow of the second fluid material 34, taken as the second fluid material 34 is entering the combination zone 44, by at least 450 degrees Celsius, such as, for example, at least 550 degrees Celsius, or such as, for example, at least 650 degrees Celsius. In some embodiments, for example, the temperature of the first plasma zone-conditioned product flow 22, taken as the product flow 22 is entering the combination zone 44, is at least 500 degrees Celsius, such as, for example, at least 600 degrees Celsius, or such as, for example, at least 700 degrees Celsius.

In some embodiments, for example, a deflector 68 is disposed within the reactor 12, and defines at least another portion of the intermediate fluid passage section-defining surface 652. In some embodiments, for example, the deflector 68 is located at a position downstream of the end of the first tube 28. In some embodiments, for example, the surface of the deflector 68 is defined by material that is not vulnerable to carburization, or by material that is less vulnerable to carburization relative to the heat sink-defining surface portion 654.

In some embodiments, for example, the sufficient, or insufficient, mixing of the first plasma zone-conditioned product flow 22 and the flow of the secondary gaseous material 34, within the intermediate fluid passage section 65, is influenced by the shape of the deflector 68. In this respect, any of the above-described effects (mitigation of energy loss through the heat sink-defining surface portion 654, mitigating carburization of the heat sink-defining surface portion 654, or cooling the first plasma zone-conditioned product flow 22) that is effected by the shape of the intermediate fluid passage section-defined surface 652, includes such effect when effected by the shape of the deflector 68.

In some embodiments, for example, the deflector 68 may be shaped for effecting turbulence within the intermediate fluid passage section 65, such turbulence effecting the mixing of the first plasma zone-conditioned product flow 22 and the flow of the second fluid material 34 within the intermediate fluid passage section 65. As described above, such mixing would be promoted when the flow of the second fluid material 34 functions as a coolant fluid. Turbulence is promoted when the rate of curvature of the downstream end of the deflector 65 is sufficiently large that the fluid flow effectively detaches from the surface of the deflector and forms vorticular flow.

In some embodiments, for example, the deflector 68 may be shaped for mitigating turbulence within the intermediate fluid passage section 65. By mitigating turbulence, mixing of the first plasma zone-conditioned product flow 22 and the flow of the second fluid material 34 within the intermediate fluid passage section 65 is mitigated. As described above, such mixing would be mitigated for minimizing energy transfer from the first plasma zone-conditioned product flow-component of the combined material fluid flow 36 and the second fluid material flow-component of the combined material fluid flow 36 within the intermediate fluid passage section 65. Turbulence is mitigated when the downstream end of the deflector 68 is gradually tapered, thereby preventing the fluid from detaching from the deflector surface and maintaining smooth flow with little mixing.

In some embodiments, for example, the deflector 68 is positionable within the reactor 12, for purposes of adjusting the cross sectional area of a space 67, defined within the intermediate fluid passage section 65, between the deflector 68 and the second tube wall 70, and thereby altering the fluid pressure characteristics within the space 67. In some embodiments, for example, the deflector is mounted within the reactor by support rods 72, and the support rods 72 are configured to facilitate positioning of the deflector 68. In some embodiments, for example, the support rods 72 may be configured to move longitudinally to effect the desired repositioning of the deflector 68, longitudinally, along the axis of the reactor. For example, the rods 72 may be fitted to move within slots or grooves provided in the reactor wall and actuated from the downstream end either manually or by means of an actuator motor.

In some embodiments, for example, it is desirable to alter the fluid pressure characteristics within the space 67, using the deflector 68, in response to a fluctuation in pressure of the first plasma zone-conditioned product flow 22, or a fluctuation in pressure of the flow of the second fluid material 34, or both. In some embodiments, for example, the adjustment is with effect that the pressure differential between the first plasma zone 18 and the downstream contacting zone is maintained constant or substantially constant.

Optionally, a flow restrictor 73 may also be provided downstream of the flow deflector 68 to further regulate the flow of the combined gas streams. In the first instance, the flow deflector 68 performs a Venturi function by regulating the differential pressure across the first reactor zone. Given the finite adjustments possible within the size constraints of the reactor system, this first pressure regulation may not be sufficient to satisfy other downstream pressure requirements, hence the utility of a second (fixed) Venturi flow restrictor.

In some embodiments, for example, and referring to FIG 3, multiple units of the plasma reactor system 10 as configured in FIGS. 1 and 2 are combined together to form another example configuration of a reactor system 100.

Each reactor system 10 in FIG 3 may be configured as shown in FIG 1, disposed radially apart relative to one another (e.g., 180 degrees apart if two reactor systems are attached, 120 degrees apart if three reactor systems are attached, etc.), and may be fluidly coupled to a central tube 102, for effecting contacting with reaction products, generated from plasma-based reactions effected within the central tube, within another downstream contacting zone 104. The central tube may be provided with one or more gas inlet ports 106, which may be configured for effecting radial or tangential injection of gas flow. The gas inlet ports function to supply a gaseous material flow 114 which is excited within the central tube by supplied electromagnetic energy to effect generation of a plasma 116 within a plasma zone 108, such that at least a fraction of the supplied gaseous material flow is converted to a flowing reaction product within the plasma zone.

Optionally, an electrode 110 may also be mounted within the central tube. The electrode may be energized with electromagnetic energy, so as to excite a supplied flow of gaseous material 114, and thereby function as a separate plasma reactor. For electromagnetic isolation, and to confine any plasma generation within the plasma zone that is localized in the vicinity of the tip of the electrode, the central tube 102 includes a fluid passage 112 for effecting fluid communication between the plasma zone 108 and the downstream contacting zone 104, and a geometry of such fluid passage is spatially configured at least upstream of the downstream contacting zone such that the supplied electromagnetic energy supply is inhibited, or substantially inhibited, from propagating from the first plasma zone to the downstream contacting zone. In this respect, the spatial configuration is similar to that of the spatial configuration of the geometry of the fluid passage which is effecting fluid communication between the first plasma zone and the downstream contacting zone, and thereby also defines a cut-off frequency for transmission of electromagnetic wave energy, and the frequency of the electromagnetic energy being supplied to effect the plasma-based reactions within the plasma zone of the second tube is less than the cut-off frequency.

A diverter 118 may be located within central tube 102 and used to produce a Venturi effect (similar to the diverter 68) for effecting the combination of the gas flows, from individual reactor systems, within the central tube. Optionally, an additional flow restrictor 119 may be provided downstream of the flow diverter 118.

The number of separate reactor systems 10 included in the configuration of FIG 3 is variable and may in some embodiments be limited only by physical size constraints. For example, one or more reactor units may be located at the same axial position along the central tube 102 and displaced radially relative to one another (e.g., 90 degrees apart, 120 degrees apart, etc.). Additionally, reactor systems 10 may be located at different axial positions along the central tube (not specifically shown) either exclusive of, or in combination with, one or more reactor units being located at the same axial position along the central tube 102, but displaced radially relative to one another.

For example, several reactors may be operated in parallel as, for example, in the production of Synthesis gas using $CO_2$ and $CH_4$ as reagent gases. Each reactor may operate under conditions which optimize that individual reactor with respect to fluid flow, power consumption, gas composition, etc. Under any particular set of operating conditions, the combined product fluid stream will have a gas composition $H_2$:CO ratio in the range of approximately 1:2 to 2:1. There is an overall requirement to maintain a controlled gas flow through each reactor, i.e. it is necessary to control the throat pressure in region 104. It may also be necessary to periodically adjust the combined fluid composition $H_2$:CO ratio by increasing the hydrogen component, in which case the reactor 102 may be operated, for example, using a reagent gas mixture of $CO_2$, $CH_4$ and $H_2O$. The flow restrictor 119 may be used to pressure balance the overall system with respect to a downstream requirement.

II. Serial Plasma-Based Reactions

In another aspect, and referring specifically to FIG 7, the first plasma zone-conditioned product is flowed to a downstream plasma zone 200, disposed within the reactor, for effecting plasma-based reactions within the downstream plasma zone 200. The flowing of the first plasma zone-conditioned product flow 22 is effected through a fluid passage 202, disposed within the reactor 12, that effects fluid communication between the first plasma zone 20 (or the "upstream plasma zone") and the downstream plasma zone 200. To effect the generation of a second plasma 201 within the downstream plasma zone 200, a second electromagnetic energy, from a second energy source 204, is supplied to the first plasma zone-conditioned product flow 22 such that at least a fraction of the first plasma zone-conditioned product flow (derived from the first plasma zone, or the "upstream plasma zone") is excited by the supplied second electromagnetic energy into the downstream plasma 201 within the downstream plasma zone 200, and such that at least a fraction of the flowing first reaction material is converted to a second reaction product while flowing through the second plasma 201.

The flowing of the first plasma zone-conditioned product is effected through a fluid passage 202 that effects fluid communication between the upstream plasma zone 20 and the downstream plasma zone 200. A geometry of the fluid passage 202 is spatially configured at least upstream of the downstream plasma zone such that the supplied first electromagnetic energy supply is inhibited, or substantially inhibited, from propagating from the upstream plasma zone to the downstream plasma zone. In some embodiments, for example, a geometry of the fluid passage is spatially configured downstream of the downstream plasma zone such that the supplied second electromagnetic energy supply is inhibited, or substantially inhibited, from propagating downstream of the downstream plasma zone.

In some embodiments, for example, the spatial configuration is such that the upstream plasma zone 20 is electromagnetically isolated, or substantially electromagnetically isolated, from the downstream plasma zone 200.

In some embodiments, for example, the spatial configuration is such that a cut-off frequency for transmission of electromagnetic wave energy is defined, and the frequency of the supplied first electromagnetic energy is less than the cut-off frequency.

In some embodiments, for example, the spatial configuration is such that an operative radius, or an operative width, of the fluid passage 200, which is effecting fluid communication between the upstream plasma zone 20 and the downstream plasma zone 200, is defined, wherein the respective one of the operative radius, or the operative width (as the case may be), is sufficiently small such that the upstream plasma zone is electromagnetically isolated, or substantially electromagnetically isolated from the downstream plasma zone. In some of these embodiments, for example, the respective one of the operative radius, or the operative width, defines a cut-off frequency for transmission of electromagnetic wave energy, and the frequency of the supplied first electromagnetic energy is less than the cut-off frequency.

In some embodiments, for example, the fluid passage 202, which is effecting fluid communication between the upstream plasma zone 20 and the downstream plasma zone 200, is defined within a conduit 206, and the material of the conduit is an electrical conductor. In some of these embodiments, for example, the conduit includes metallic material. In some embodiments, for example, the conduit is made from any one of steel, aluminium, copper, and alloys thereof. In some embodiments, for example, the conduit is made from alloys of steel including cobalt, nickel and chromium in proportions specifically designed to mitigate against carburization effects of high temperature operation.

In some embodiments, for example, the maximum distance between the upstream plasma zone 20 and the downstream plasma zone 100, measured along the longitudinal axis of the fluid passage 202, is less than 100 centimetres. In some of these embodiments, for example, the maximum distance between the first plasma zone 20 and the downstream plasma zone 100, measured along the longitudinal axis of the fluid passage 200 connecting the upstream plasma zone 20 and the downstream plasma zone 100, is less than 50 centimetres.

In some embodiments, for example, the time duration for transport of the first plasma zone-conditioned product flow 22 from the first plasma zone 20 to the downstream plasma zone 100 is less than 2.5 seconds. In some embodiments, for example, the time duration for transport of the first plasma zone-conditioned product flow 22 from the first plasma zone 20 to the downstream plasma zone 100 is less than 1.0 seconds.

In some embodiments, for example, the distance between the upstream plasma zone 20 and the downstream plasma zone 100 is pre-selected independently of the pre-selection of the supplied electromagnetic energy.

By providing a geometry of the fluid passage 202, which is effecting fluid communication between the upstream plasma zone 20 and the downstream plasma zone 100, that is spatially configured at least upstream of the downstream plasma zone 100 such that the supplied first electromagnetic energy supply is inhibited, or substantially inhibited, from propagating from the upstream plasma zone 20 to the downstream plasma zone 100, it becomes possible, in at least some embodiments, to effect closer disposition of the downstream plasma zone 100 to the first plasma zone, while specifying the processes being effected within the downstream plasma zone 100, and controlling those processes, independently of the specification and control of the processes in the first plasma zone. By facilitating closer disposition of the downstream plasma zone 100 relative to the upstream plasma zone 20, thermal losses suffered by material, derived from the primary gaseous material flow 16, (including at least the first plasma zone-conditioned product, and, in some embodiments, for example, including unreacted or unconditioned primary gaseous material flow 16) while the material travels from the first plasma zone 20 to the downstream plasma zone 100, are mitigated, thereby better preserving the activity (or state of excitement) of the first plasma zone-conditioned product supplied to the downstream plasma zone 100.

In some embodiments, for example, the distance between the first plasma zone 20 and the downstream plasma zone 100 may be pre-selected with effect that the first plasma zone-conditioned product flow 22 is disposed above a predetermined minimum temperature when becoming disposed within the downstream plasma zone 100. In some of these embodiments, for example, the disposition, of the first plasma zone-conditioned product flow 22, above that of the predetermined minimum temperature, is with effect that a desired outcome is effected by the supply of the first plasma zone-conditioned product flow 22, when disposed above the predetermined minimum temperature, to the downstream plasma zone 100. In some of these embodiments, for example, the distance between the first plasma zone 20 and the downstream plasma zone 100 may be pre-selected with effect that the first plasma zone-conditioned product flow 22 is disposed below a predetermined maximum temperature when becoming disposed within the downstream plasma zone 100. In some of these embodiments, for example, the disposition, of the first plasma zone-conditioned product flow 22, above that of the predetermined minimum temperature, but below that of the predetermined maximum temperature, is with effect that a desired outcome is effected by the contacting.

For mitigating loss of thermal energy, generated within the first plasma zone 20, to the environment external to the material processing zone of the reactor 12, in some embodiments, for example, the reactor 12 is thermally insulated. In this respect, in some embodiments, for example, the reactor 12 includes a material processing zone-defining structure 46 (that defines the material processing zone 14), and an insulating material 48 is disposed about the external surface of the material processing zone-defining structure 46. In some embodiments, for example, the insulating material 48 includes ceramic paper products capable of withstanding operating temperatures of at least 1200 degrees Celsius. These materials are in sheet or blanket form and may be cut and formed around the reactor and associated pipe and fittings. These materials, typically built up in layers of approximately one (1) inch in thickness, are configured to prevent heat loss to the extent that the temperature within the downstream plasma zone 200 is above a predetermined minimum temperature.

In some embodiments, for example, the first plasma zone-conditioned product flow 22 includes unreacted primary gaseous material flow 16. In such embodiments, the residence time of the primary gaseous material flow 16 within the first plasma zone 20 is not of sufficient duration to effect complete conversion of the primary gaseous material flow 16, such that at least a portion of the primary gaseous material flow 16 remains unreacted after leaving the first plasma zone 20. In such embodiments, for example, conversion of at least a fraction of the unreacted primary gaseous material flow 16 is effected within the downstream plasma zone 200. The degree of completion of a reaction within a plasma zone is determined by the electromagnetic power density, the reagent gas flow rate and the reagent gas composition. In some embodiments, for example, it may be preferable to operate the first plasma at a relatively low temperature (low power) in order to selectively produce desired products or to avoid producing undesired products. In this case, some of the reagent gas may not react and will be present in the first plasma zone-conditioned product flow 22. The unreacted reagents, within the first plasma zone-conditioned product flow 22, may then be processed in the downstream plasma zone 100.

In some embodiments, for example, a flow of the second fluid material 34 is supplied to the downstream plasma zone 200 for, in combination with the supplied first plasma zone-conditioned product flow 22, effecting a heterogeneous plasma-based reaction.

In some embodiments, for example, thermal energy, generated within the first plasma zone 20, is indirectly communicated to the flow of the second fluid material 34, prior to supplying the flow of the second fluid material 34 to the downstream contacting zone 24, for effecting heating of the second fluid material 34. In some of these embodiments, for example, the rate of transfer of thermal energy from the first plasma zone 20 to the second fluid material flow 34, is with effect that, prior to supplying the flow of the second fluid material 34 to the downstream plasma zone 200, the temperature of the flow of the second fluid material 34 is below a predetermined maximum temperature. In some embodiments, for example, the indirect communication of the thermal energy is effected by flowing the second fluid material 34 within a tubing coil wrapped around the external wall surface, of the reactor, in close proximity to the plasma zone 20, thereby effecting heat transfer from the reactor wall to the second fluid material 34.

In some embodiments, for example, the use of successive plasma processes involving at least some of the same flows may be necessary, for example, when the plasma process involves more than one reagent for which the plasma operating conditions can only be optimized for one reagent at a time. For example, in the plasma process to convert $CO_2$ and $CH_4$ into Synthesis gas ($H_2$, CO), the process may be optimized for energy efficiency for either $H_2$ or CO selectivity, but not for both in the same reaction. If, for example, the first plasma process is optimized for $H_2$ selectivity, the product gas from this operation will contain a high $H_2$ concentration, a low CO concentration, some excess $CO_2$ and some unreacted $CH_4$. The second plasma operation may be optimized for maximum CO selectivity by adding additional CH4 and $CO_2$ (in appropriate proportions) to the first plasma reaction product stream and reacting them in the second plasma zone. The result is that each of the plasma operations has been optimized and the resultant product stream has the requisite component composition. In each case for the above example, the selectivity of the plasma process is controlled by adjustment of the reagent gas composition.

As another example, the reactor system 10 may be configured to produce synthesis gas (CO and $H_2$), and the reagent feed to the first plasma zone 20 may be $CO_2$ and $CH_4$, and the plasma operation within the first plasma zone 20 may be optimized for maximum CO selectivity. The first plasma zone-conditioned product flow 22 will include CO, $CO_2$, $H_2$ and $CH_4$. The second reagent gas flow (i.e. the second fluid material flow 208) may contain $CH_4$ and $H_2O$ to react together with the first plasma zone-conditioned product flow 22 in the downstream plasma zone 200, optimized for maximum $H_2$ selectivity, to produce a product substantially composed of a hydrogen-enriched synthesis gas.

Referring to FIG 7, in one example configuration, the reactor includes first and second waveguides 26, 204 for the supplying of, respectively, the first electromagnetic energy and the second electromagnetic energy.

The first electromagnetic energy is supplied through the first waveguide 26. The first waveguide has disposed therein a portion of a first conducting tube 210 arranged to pass between the walls of the first waveguide 26. A waveguide-to-coaxial transformer is thereby formed, which is configured to couple electromagnetic wave energy propagating through the first waveguide 26 into the first conducting tube 210.

In similar fashion, the second electromagnetic energy is supplied through the second rectangular waveguide 204. The second waveguide 204 has disposed therein a portion of a second conducting tube 212 forming a second waveguide-to-coaxial transformer between the second waveguide 204 and the second conducting tube 212. The first and second conducting tubes 210 and 212 may be metallic. In some embodiments, for example, the tubes 210 and 212 are cylindrical. In some embodiments, for example, the tubes 210 and 212 are rectangular (or even other shapes).

In some embodiments, for example, the first and second cylindrical tubes 210 and 212 are disposed coaxially, or substantially coaxially, with each other within a reactor tube 214, which is also disposed coaxially, or substantially coaxially, with the first and second tubes 210 and 212. The radii of tubes 210, 212 and 214 are variable, but provided that the first tube 210 may be disposed within the second tube 212, and that the second tube 212 may then itself be disposed within the reactor tube 214.

Waveguides 222 and 220 are separated and connected by a coaxial transmission line section 216 formed between the first tube 210 (i.e., the inner conductor in coaxial transmission line section 216) and the reactor tube 214 (i.e., the outer conductor in coaxial transmission line section 216). Likewise waveguide 220 is separated and connected to reactor tube 6 by a coaxial transmission line section 218 formed between the second tube 212 (i.e., the inner conductor in coaxial transmission line section 218) and the reactor tube 214 (i.e., the outer conductor in coaxial transmission line section 218).

The microwave power densities in the respective plasma zones 20, 200 are determined by the separation between the central and outer coaxial conductors. For example, the power density in the first plasma zone 20 is determined by the radial separation between conductor 212 and the conductor 214, whereas the power density in the downstream plasma zone 200 is determined by the radial separation between the conductor 210 and the conductor 214; the separation in the latter case is necessarily larger and hence it will require a higher power (P1) to produce a power density equivalent to that in the first plasma zone 20.

The conductor 214 is provided with one or more gas inlet ports 224 for supplying the primary gaseous material flow. In some embodiments, for example, the gas inlet ports are oriented for supplying the primary gaseous material flow as a tangential gas flow, thereby causing such gas flow to form a vortex pattern within the conductor 214.

The conductor 210 is provided with one or more gas inlet ports 208 for supplying the flow of the second fluid material 34. The second fluid material 34 flows through the conductor 210 and is combined with the first plasma zone-conditioned product flow 22 within the downstream plasma zone 200, for effecting a heterogeneous plasma-based reaction.

Figure 8:
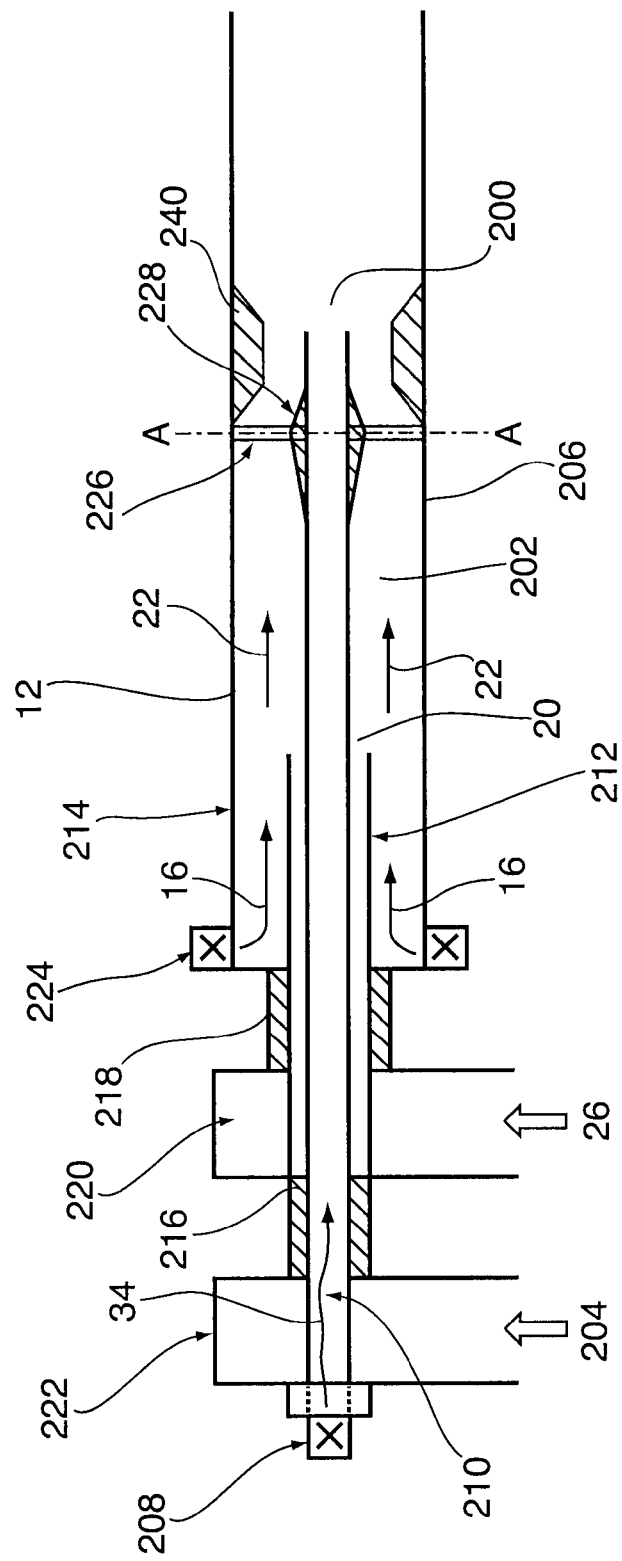
FIG 8 shows another example configuration of a plasma reactor system according to the disclosure, in which separate plasma processes are configured to be effected, in series, and where flow characteristics are attenuated with a Venturi ring.

Referring to FIG 8, in some embodiments, for example, a Venturi ring 240 is provided and extends from an inner wall of the conductor 214, and provides a Venturi effect, similar to that effected within the embodiment illustrated in FIGS. 1 and 2. The Venturi effect that is effected by the Venturi ring 240 is for inducing flow of reaction products, generated within the downstream plasma zone, in a direction downstream from the downstream plasma zone 200, under the influence of the first plasma zone-conditioned product flow 22 that is flowing past the downstream plasma zone 200. In this respect, the Venturi ring 240 effects a pressure drop to the first plasma zone-conditioned product flow 22, resulting in a sufficient reduction to induce the reaction products to combine with such flow and proceed downstream from the downstream plasma zone 200.

In operation, electromagnetic energy, such as microwave energy, supplied to the waveguide 220, is coupled into second conducting tube 212, whereby it is conducted downstream by the coaxial transmission section formed between second tube 212 and reactor tube 214. The coupled microwave energy is sufficient to excite the primary gaseous material flow within the upstream plasma zone 20, localized around the downstream end of second tube 212, such that a first plasma is generated within the upstream plasma zone 20, and the at least a fraction of the primary gaseous material flow is converted to a first plasma zone-conditioned product flow 22 that is conducted downstream to the downstream plasma zone 200. Reactor tube 214 defines the fluid passage which effects fluid communication between the upstream reaction zone and the downstream reaction zone. The localization of the upstream plasma zone 20 is attributable to the spatial configuration of a cross-sectional area of the reactor tube 214 which, as described above, is such that the supplied first electromagnetic energy is inhibited, or substantially inhibited, from propagating from the upstream plasma zone to the downstream plasma zone. Because the first electromagnetic energy P2 is transmitted downstream by a coaxial transmission line section, only negligible electromagnetic energy is propagated beyond the end of second cylindrical tube 212.

The electromagnetic energy, supplied to the waveguide 222, is coupled into the first cylindrical conducting tube 210, whereby it is conducted downstream by the coaxial transmission section formed between the first tube 210 and, at first, the second tube 212, and then the reactor tube 214. The coupled electromagnetic energy is sufficient to excite the first plasma zone-conditioned product flow within the downstream plasma zone 200, localized around the downstream end of first tube 210, such that the second plasma is generated within the downstream plasma zone 200, and plasma-based reactions are effected such that a second reaction product flow is generated. In some embodiments, a separate gaseous reagent flow is supplied from port 208 to the downstream plasma zone 200, for effecting a heterogeneous plasma-based reaction.

Electromagnetic isolation, or substantial electromagnetic isolation, of the upstream plasma zone 20 from the supplied second electromagnetic energy is effected. In this respect, a geometry of the reactor tube 214 is spatially configured such that the supplied second electromagnetic energy is inhibited, or substantially inhibited, from propagating from the downstream plasma zone 200 to the upstream plasma zone 20, as is further explained above.

In some embodiments, for example, a metallic blade assembly 226 is provided for supporting the tube 210. In some of these embodiments, for example, the metallic blade assembly 226 is also provided for effecting further electromagnetic isolation between the upstream and downstream plasma zones 20, 200. The electromagnetic isolation between the first and second plasma zones is dependent primarily upon the "cutoff" condition of the tube 214 (i.e. the diameter of the tube is less than that required for the tube to operate as a propagating waveguide at the microwave frequency being used). The wave attenuation of a cutoff tube is dependent upon the attenuation factor (attenuation per unit length) and the tube length. Furthermore, the presence of a plasma in the cutoff tube may reduce the attenuation factor by effectively "extending" the central coaxial conductor, hence the electromagnetic isolation provided by a cutoff tube may be degraded if a plasma is present within all or part of the tube. It is therefore possible that some electromagnetic field from the first plasma zone may persist in the downstream zone and therefore the metallic blade assembly 226 is provided to effect further electromagnetic isolation.

The metallic blade assembly 226 is mounted within the reactor tube 214, substantially along the axis of the reactor tube 214, between the upstream and downstream plasma zones. The metallic blade assembly 226 is held stationary within reactor tube 214 and has blades angled so as to conform to the vortex flows of gas within reactor tube 214. A dielectric spacer 228 may be used to electrically insulate the metallic blade assembly 26 from first cylindrical conducting tube 210. The metallic blade assembly 226 is in electrical contact with tube 214 but must not be in electrical contact with the tube 210, hence the requirement for a dielectric sleeve 228 which will support the blade assembly as well as affix to the tube 210. Furthermore, the blade assembly is located at a position of minimum magnetic field intensity with respect to the end of tube 210 (i.e. at a distance of one-half wavelength at the microwave frequency being used). To minimize turbulence of the gas flow within reactor tube 214, dielectric spacer 226 may also be tapered accordingly.

Because electromagnetic energy is only propagated through coaxial transmission line sections within the dual-stage plasma reactor, there is substantial isolation between the two sources of electromagnetic energy 26 and 204. Electromagnetic energy coupled through the second tube 212 is isolated from and does not mix with electromagnetic energy coupled through first cylindrical tube 210, and vice versa. Tubes 210 and 212 may be associated with different ground potentials to achieve such effect. Due to electromagnetic isolation, the physical spacing between the upstream and downstream plasma zones 20 and 200 may be made arbitrarily short as a way of controlling the timing between sequential plasma reactions, i.e., the closer the plasma regions 20 and 200 are in space, the less amount of time between the reactions.

In the above description, for purposes of explanation, numerous details are set forth in order to provide a thorough understanding of the present disclosure. However, it will be apparent to one skilled in the art that these specific details are not required in order to practice the present disclosure. Although certain dimensions and materials are described for implementing the disclosed example embodiments, other suitable dimensions and/or materials may be used within the scope of this disclosure. All such modifications and variations, including all suitable current and future changes in technology, are believed to be within the sphere and scope of the present disclosure. All references mentioned are hereby incorporated by reference in their entirety.

The invention claimed is:

1. A method comprising:
supplying a first electromagnetic energy, from a first energy source, to a flowing primary gaseous feed material, such that at least a first fraction of the flowing primary gaseous feed material is excited by the supplied first electromagnetic energy into a first plasma within a first plasma zone, and such that at least a second fraction of the flowing primary gaseous feed material is converted to a first plasma zone-conditioned product while flowing through the first plasma zone, and the first plasma zone-conditioned product is flowed to a downstream contacting zone, wherein the flowing of the first plasma zone-conditioned product is effected through a first fluid passage that effects fluid communication between the first plasma zone and the downstream contacting zone;
introducing a second gaseous material to the downstream contacting zone;
contacting the first plasma zone-conditioned product with the second gaseous material within the downstream contacting zone;
wherein a geometry of the first fluid passage at least upstream of the downstream contacting zone inhibits, or substantially inhibits, the supplied first electromagnetic energy from propagating from the first plasma zone to the downstream contacting zone; and
supplying a second electromagnetic energy, from a second energy source, to a flowing secondary gaseous feed material such that at least a first fraction of the flowing secondary gaseous feed material is excited by the supplied second electromagnetic energy into a second plasma within a second plasma zone, and such that at least a second fraction of the flowing secondary gaseous feed material is converted to a second plasma zone-conditioned product while flowing through the second plasma zone, and the second plasma zone-conditioned product is flowed to the downstream contacting zone, wherein the second gaseous material includes the second plasma zone-conditioned product, wherein the flowing of the second plasma zone-conditioned product is effected through a second fluid passage that effects fluid communication between the second plasma zone and the downstream contacting zone, wherein the second plasma zone is electromagnetically isolated, or substantially electromagnetically isolated, from both of the first plasma zone and the downstream contacting zone.

2. The method as claimed in claim 1;
wherein the geometry of the first fluid passage is such that the first plasma zone is electromagnetically isolated, or substantially electromagnetically isolated, from the downstream contacting zone.

3. The method as claimed in claim 1,
wherein a spatial configuration is such that a cut-off frequency for transmission of electromagnetic wave energy is defined, and the frequency of the first supplied electromagnetic energy is less than the cut-off frequency.

4. The method as claimed in claim 1;
wherein the geometry of the first fluid passage defines an operative dimension that is sufficiently small, relative to a wavelength of the first supplied electromagnetic energy, such that the first plasma zone is electromagnetically isolated, or substantially electromagnetically isolated, from the downstream contacting zone.

5. The method as claimed in claim 1;
wherein the first electromagnetic energy is supplied at a frequency which is less than a cut-off frequency for transmission of electromagnetic wave energy defined by the geometry of the first fluid passage.

6. The method as claimed in claim 1,
wherein the first fluid passage is defined within a conduit, and the material of the conduit is electromagnetically conductive.

7. The method as claimed in claim 1,
wherein the electromagnetic energy is microwave frequency energy, radio frequency energy, high frequency energy, ultra high frequency energy, or acoustic energy.

8. The method as claimed in claim 1, wherein the electromagnetic energy is microwave frequency energy.

9. The method as claimed in claim 1;
wherein a geometry of the second fluid passage, which is effecting fluid communication between the second plasma zone and the downstream contacting zone, at least upstream of the downstream contacting zone inhibits, or substantially inhibits, the supplied second electromagnetic energy from propagating from the second plasma zone to both of the first plasma zone and the downstream contacting zone.

10. The method as claimed in claim 1;
wherein the second fluid passage, which is effecting fluid communication between the second plasma zone and the downstream contacting zone, is defined within a conduit, and the material of the conduit is electrically conductive.

11. The method as claimed in claim 1;
wherein the first plasma zone is located within a material processing zone of a reactor, and wherein the reactor includes a material processing zone-defining structure, and an insulating material is disposed about at least a fraction of an external surface of the material processing zone-defining structure.

12. The method as claimed in claim 1, further comprising:
indirectly communicating thermal energy, generated within the first plasma zone, to the second gaseous material.

13. The method as claimed in claim 1, further comprising:
prior to the contacting of the second gaseous material with the first plasma zone-conditioned product within the downstream contacting zone, flowing the second gaseous material through a third fluid passage defined by a third fluid passage-defining conduit, to a combination zone, for combining the second gaseous material with the first plasma zone-conditioned product;
wherein, upstream of the combination zone, at an upstream fluid passage portion of the third fluid passage-defining conduit, the second fluid material is characterized by a pressure of PSF1;

wherein, upstream of the combination zone, the first plasma zone-conditioned product, with which the flowing second fluid material is combined, is characterized by a pressure PFRP, wherein the pressure PSF1 of the second fluid material is greater than the pressure PFRP of the first plasma zone-conditioned product;

effecting a reduction in pressure of the second gaseous material from PSF1, such that the second gaseous material becomes disposed at the pressure PSF2 at an intermediate downstream fluid passage portion of the third fluid passage-defining conduit, wherein the pressure PSF2 is less than PFRP, wherein the reduction is effected by conducting the second gaseous material from the upstream fluid passage portion to the intermediate downstream fluid passage portion, wherein the intermediate downstream fluid passage portion is characterized by a smaller cross-sectional area relative to the cross-sectional area of the upstream fluid passage portion, such that static pressure energy of the second gaseous material is converted to kinetic energy, and the pressure of the second gaseous material is reduced from PSF1 to PSF2, and such that the second gaseous material, characterized by the pressure PSF2 and disposed at the intermediate downstream fluid passage portion, is disposed in fluid communication with the first plasma zone-conditioned product through a port that extends through the third fluid passage-defining conduit and into the intermediate downstream fluid passage portion, such that the first plasma zone-conditioned product is induced to flow into the intermediate downstream fluid passage portion and combine with the flowing second gaseous material within the combination zone, in response to the differential between the pressure PFRP of the first plasma zone-conditioned product and the pressure PSF2 of the second gaseous material;

combining the second gaseous material with the first plasma zone-conditioned product, within the combination zone, to generate a combined fluid material in response to inducement to flow;

and supplying the combined fluid material to the downstream contacting zone.

14. The method as claimed in claim 1,
wherein a maximum distance between the first plasma zone and the downstream contacting zone, measured along a longitudinal axis of the fluid passage connecting the first plasma zone and the downstream contacting zone, is less than 100 centimeters.

15. The method as claimed in claim 1,
wherein the maximum distance between the first plasma zone and the downstream contacting zone, measured along the longitudinal axis of the fluid passage connecting the first plasma zone and the downstream contacting zone, is less than 50 centimeters.

16. The method as claimed in claim 1,
wherein a time duration for transport of the first plasma zone-conditioned product from the first plasma zone to the downstream contacting zone is less than 2.5 seconds.

17. The method as claimed in claim 1,
wherein a time duration for transport of the first plasma zone-conditioned product from the first plasma zone to the downstream contacting zone is less than 1.0 seconds.

18. The method as claimed in claim 1, further comprising:
prior to contacting the first plasma zone-conditioned product with the second gaseous material within the downstream contacting zone, combining the first plasma zone-conditioned product with the second gaseous material within a combination zone to generate a combined fluid material flow, wherein the combination zone is connected to the downstream contacting zone with an intermediate fluid passage section, the intermediate fluid passage section being defined by an intermediate fluid passage section-defining surface, the intermediate fluid passage section including a combination zone-defining fluid passage portion, wherein the intermediate fluid passage section-defining surface includes a heat sink-defining surface portion, the heat sink-defining surface portion being defined as that portion, of the intermediate fluid passage section-defining surface, which defines a internal surface portion of a wall portion of a reaction vessel, relative to which a corresponding opposite external surface portion of the wall portion is disposed in heat transfer communication with a heat sink fluid, the heat sink fluid having a heat sink fluid temperature that is lower than the temperature of the first plasma zone-conditioned product, taken as the first plasma zone-conditioned product is entering the combination zone, by at least 200 degrees Celsius, wherein the intermediate fluid passage section-defining surface is shaped with effect that, while the generation of the first plasma, within the first plasma zone, is being effected, and while the generation of the first plasma zone-conditioned product is being effected in response to the flowing of the primary gaseous feed material through the first plasma zone, and while the first plasma zone-conditioned product flow is being supplied to the intermediate fluid passage section, and while the supplied first plasma zone-conditioned product is being combined with the secondary gaseous material within the combination zone of the intermediate fluid passage section to generate the combined fluid material flow, and while the combined fluid material flow is being flowed through the intermediate fluid passage section, the first plasma zone-conditioned product is not mixed with the second gaseous material within the intermediate fluid passage section to a sufficient extent so as to effect sufficient heat transfer from the combined fluid material flow and across the heat sink-defining surface portion, such that the temperature of the combined fluid material flow, that is disposed adjacent to the heat sink-defining surface portion, is exceeded by the temperature of the first plasma zone-conditioned product, taken as the first plasma zone-conditioned product is entering the combination zone, by at least 200 degrees Celsius.

19. The method as claimed in claim 18;
wherein the intermediate fluid passage section-defined surface is further shaped with effect that, while the generation of the first plasma, within the first plasma zone, is being effected, and while the generation of the first plasma zone-conditioned product is being effected in response to the flowing of the primary gaseous material through the first plasma zone, and while the first plasma zone-conditioned product is being supplied to the intermediate fluid passage section, and while the supplied first plasma zone-conditioned product is being combined with the second fluid material within the combination zone of the intermediate fluid passage section to generate the combined fluid material flow, and while the combined fluid material flow is being flowed through the intermediate fluid passage section, the first plasma zone-conditioned product flow is not mixed with the second fluid material within the intermediate fluid passage section to a sufficient extent so as to effect transport of carbon-comprising particulate material generated within the first plasma zone towards the heat sink-defining surface portion, such that at least 90weight % of carbon-comprising particulate material within the intermediate fluid passage section, based on the total weight of carbon-comprising particulate material that is disposed within the intermediate fluid passage section, is spaced apart from heat sink-defining surface portion by a minimum distance of at least four (4) centimetres.

20. The method as claimed claim 1, further comprising:
prior to contacting the first plasma zone-conditioned product with the second gaseous material within the downstream contacting zone, combining the first plasma zone-conditioned product with the second gaseous material within a combination zone to generate a combined fluid material flow;
wherein the combination zone is connected to the downstream contacting zone with an intermediate fluid passage section, the intermediate fluid passage section being defined by an intermediate fluid passage section-defining surface, the intermediate fluid passage section including a combination zone-defining fluid passage portion, wherein the intermediate fluid passage section-defining surface includes a heat sink-defining surface portion, the heat sink-defining surface portion being defined as that portion, of the intermediate fluid passage section-defining surface, which defines a internal surface portion of a wall portion of a reaction vessel, relative to which a corresponding opposite external surface portion of the wall portion is disposed in heat transfer communication with a heat sink fluid, the heat sink fluid having a heat sink fluid temperature that is lower than the temperature of the first plasma zone-conditioned product, taken as the first plasma zone-conditioned product is entering the combination zone, by at least 200 degrees Celsius, wherein the intermediate fluid passage section-defined surface is shaped with effect that, while the generation of the first plasma, within the first plasma zone, is being effected, and while the generation of the first plasma zone-conditioned product is being effected in response to the flowing of the primary gaseous material through the first plasma zone, and while the first plasma zone-conditioned product is being supplied to the intermediate fluid passage section, and while the supplied first plasma zone-conditioned product is being combined with the second fluid material within the combination zone of the intermediate fluid passage section to generate the combined fluid material flow, and while the combined fluid material flow is being flowed through the intermediate fluid passage section, the first plasma zone-conditioned product is not mixed with the second fluid material within the intermediate fluid passage section to a sufficient extent so as to effect transport of carbon-comprising particulate material generated within the first plasma zone towards the heat sink-defining surface portion, such that at least 90 weight % of carbon-comprising particulate material within the intermediate fluid passage section, based on the total weight of carbon-comprising particulate material that is disposed within the intermediate fluid passage section, is spaced apart from the heat sink-defining surface portion by a minimum distance of at least four (4) centimetres.

21. The method as claimed in claim 1, further comprising:
prior to contacting the first plasma zone-conditioned product with the second gaseous material within the downstream contacting zone, combining the first plasma zone-conditioned product with the second gaseous material within a combination zone to generate a combined fluid material flow;
wherein the combination zone is connected to the downstream contacting zone with an intermediate fluid passage section, the intermediate fluid passage section being defined by an intermediate fluid passage section-defining surface, the intermediate fluid passage section including a combination zone-defining fluid passage portion, wherein the intermediate fluid passage section-defining surface includes a heat sink-defining surface portion, the heat sink-defining surface portion being defined as that portion, of the intermediate fluid passage section-defining surface, which defines a internal surface portion of a wall portion of a reaction vessel, relative to which a corresponding opposite external surface portion of the wall portion is disposed in heat transfer communication with a heat sink fluid, the heat sink fluid having a heat sink fluid temperature that is lower than the temperature of the first plasma zone-conditioned product, taken as the first plasma zone-conditioned product is entering the combination zone, by at least 200 degrees Celsius, wherein the intermediate fluid passage section-defined surface is shaped with effect that, while the generation of the first plasma, within the first plasma zone, is being effected, and while the generation of the first plasma zone-conditioned product is being effected in response to the flowing of the primary gaseous material through the first plasma zone, and while the first plasma zone-conditioned product is being supplied to the combination zone of the intermediate fluid passage section, and while the supplied first plasma zone-conditioned product is being combined with the secondary gaseous material within the intermediate fluid passage section to generate the combined fluid material flow, and while the combined fluid material flow is being flowed through the intermediate fluid passage section, the first plasma zone-conditioned product flow is mixed with the flow of the secondary gaseous material within the combination zone of the intermediate fluid passage section to a sufficient extent such that the temperature, of the combined fluid material flow that is:

(a) spaced-apart from the heat sink-defining surface portion by a minimum distance of at least four (4) centimetres, and (b) disposed within a fluid passage cross-section, of the intermediate fluid passage section, disposed downstream from the downstream combination zone, by an axial distance ("AD") of less than four (4) centimetres, is exceeded by the temperature of the first plasma zone-conditioned product, taken as the first plasma zone-conditioned product is entering the combination zone, by at least 200 degrees Celsius.

* * * * *